United States Patent
Shedletsky et al.

(10) Patent No.: US 11,347,351 B2
(45) Date of Patent: May 31, 2022

(54) REJECTION OF FALSE TURNS OF ROTARY INPUTS FOR ELECTRONIC DEVICES

(71) Applicant: Apple Inc., Cupertino, CA (US)

(72) Inventors: Anna-Katrina Shedletsky, Mountain View, CA (US); Christopher M. Werner, San Jose, CA (US); Colin M. Ely, Sunnyvale, CA (US); Samuel Weiss, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/118,088

(22) Filed: Dec. 10, 2020

(65) Prior Publication Data

US 2021/0096688 A1    Apr. 1, 2021

Related U.S. Application Data

(63) Continuation of application No. 16/840,336, filed on Apr. 4, 2020, now Pat. No. 10,884,549, which is a
(Continued)

(51) Int. Cl.
  *G06F 3/041* (2006.01)
  *G06F 3/0362* (2013.01)
  (Continued)

(52) U.S. Cl.
  CPC ............ *G06F 3/0418* (2013.01); *G06F 1/163* (2013.01); *G06F 1/1626* (2013.01);
  (Continued)

(58) Field of Classification Search
  None
  See application file for complete search history.

(56) References Cited

U.S. PATENT DOCUMENTS 2,237,860 A    4/1941 Bolle
2,288,215 A    6/1942 Taubert et al.
(Continued)

FOREIGN PATENT DOCUMENTS

CH    1888928    1/1937
CN    1302740    9/2001
(Continued)

OTHER PUBLICATIONS

Author Unknown, "Desirable Android Wear smartwatch from LG," Gulf News, Dubai, 3 pages, Jan. 30, 2015.
(Continued)

*Primary Examiner* — Nicholas J Lee
(74) *Attorney, Agent, or Firm* — Brownstein Hyatt Farber Schreck, LLP

(57) ABSTRACT

Various embodiments for detecting and rejecting false, unintended rotations of rotary inputs of electronic devices are disclosed herein. In one example, an electronic device is provided with an optical detector that measures the distance between the electronic device and the wearer's forearm or hand, and when the distance is smaller than a threshold distance, the turns of the rotary input are false, unintended turns. In another example, a crown of a rotary input includes a plurality of capacitive sensors that detects the presence of a wearer's finger, which when absent, the turns of the rotary input are false turns. In another example, deflections or positions of a shaft of the rotary input are measured and if the deflections/positions indicate an upward force on the rotary input (which are likely caused by the wearer's forearm or hand), the turns of the rotary input are false turns. Other embodiments are described herein.

20 Claims, 14 Drawing Sheets

Related U.S. Application Data continuation of application No. 16/262,728, filed on Jan. 30, 2019, now Pat. No. 10,613,685, which is a continuation of application No. 16/048,081, filed on Jul. 27, 2018, now Pat. No. 10,222,909, which is a continuation of application No. 15/117,819, filed as application No. PCT/US2014/016079 on Feb. 12, 2014, now Pat. No. 10,048,802.

(51) Int. Cl.
  *G06F 1/16* (2006.01)
  *G06F 3/042* (2006.01)
  *G06F 3/044* (2006.01)

(52) U.S. Cl.
  CPC ............ *G06F 3/0362* (2013.01); *G06F 3/044* (2013.01); *G06F 3/0421* (2013.01); *G06F 2203/04106* (2013.01)

(56) References Cited

U.S. PATENT DOCUMENTS

| | | |
|---|---|---|
| 2,497,935 A | 2/1950 | Feurer |
| 2,771,734 A | 11/1956 | Morf |
| 2,788,236 A | 4/1957 | Kafowi |
| 2,797,592 A | 7/1957 | Marrapese |
| 3,040,514 A | 6/1962 | Dinstman |
| 3,056,030 A | 9/1962 | Kelchner |
| 3,130,539 A | 4/1964 | Davis |
| 3,355,873 A | 12/1967 | Morf |
| 3,362,154 A | 1/1968 | Perret |
| 3,410,247 A | 11/1968 | Dronberger |
| 3,495,398 A | 2/1970 | Widmer et al. |
| 3,577,876 A | 5/1971 | Spadini |
| 3,621,649 A | 11/1971 | Vulcan et al. |
| 3,662,618 A | 5/1972 | Kroll et al. |
| 3,733,803 A | 5/1973 | Hiraga |
| 4,007,347 A | 2/1977 | Haber |
| 4,031,341 A | 6/1977 | Wuthrich et al. |
| 4,037,068 A | 7/1977 | Gaynor |
| 4,077,200 A | 3/1978 | Schneider |
| 4,133,404 A | 1/1979 | Griffin |
| 4,170,104 A | 10/1979 | Yamagata |
| 4,258,096 A | 3/1981 | LaMarche |
| 4,287,400 A | 9/1981 | Kitik |
| 4,289,400 A | 9/1981 | Kubola et al. |
| 4,311,026 A | 1/1982 | Ochoa |
| 4,311,990 A | 1/1982 | Burke |
| 4,324,956 A | 4/1982 | Sakakino et al. |
| 4,345,119 A | 8/1982 | Latasiewicz |
| 4,364,674 A | 12/1982 | Tesch |
| 4,379,642 A | 4/1983 | Meyrat |
| 4,395,134 A | 7/1983 | Luce |
| 4,396,298 A | 8/1983 | Ripley |
| 4,417,824 A | 11/1983 | Paterson et al. |
| 4,448,199 A | 5/1984 | Schmid |
| 4,520,306 A | 5/1985 | Kirby |
| 4,581,509 A | 4/1986 | Sanford et al. |
| 4,600,316 A | 7/1986 | Besson |
| 4,617,461 A | 10/1986 | Subbarao et al. |
| 4,634,861 A | 1/1987 | Ching et al. |
| 4,641,026 A | 2/1987 | Garcia, Jr. |
| 4,670,737 A | 6/1987 | Rilling |
| 4,766,642 A | 8/1988 | Gaffney et al. |
| 4,783,772 A | 11/1988 | Umemoto et al. |
| 4,884,073 A | 11/1989 | Souloumiac |
| 4,914,831 A | 4/1990 | Kanezashi et al. |
| 4,922,070 A | 5/1990 | Dorkinski |
| 4,931,794 A | 6/1990 | Haag |
| 4,952,799 A | 8/1990 | Loewen |
| 4,980,685 A | 12/1990 | Souloumiac et al. |
| 4,987,299 A | 1/1991 | Kobayashi et al. |
| 5,034,602 A | 7/1991 | Garcia et al. |
| 5,177,355 A | 1/1993 | Branan |
| 5,214,278 A | 5/1993 | Banda |
| 5,258,592 A | 11/1993 | Nishikawa et al. |
| 5,288,993 A | 2/1994 | Bidiville et al. |
| 5,347,123 A | 9/1994 | Jackson et al. |
| 5,383,166 A | 1/1995 | Gallay |
| 5,471,054 A | 11/1995 | Watanabe |
| 5,477,508 A | 12/1995 | Will |
| 5,509,174 A | 4/1996 | Worrell |
| 5,559,761 A | 9/1996 | Frenkel et al. |
| 5,572,314 A | 11/1996 | Hyman et al. |
| 5,583,560 A | 12/1996 | Florin et al. |
| 5,631,881 A | 5/1997 | Pessey et al. |
| 5,726,645 A | 3/1998 | Kamon et al. |
| 5,748,111 A | 5/1998 | Bates |
| 5,825,353 A | 10/1998 | Will |
| 5,841,050 A | 11/1998 | Clift et al. |
| 5,847,335 A | 12/1998 | Sugahara et al. |
| 5,867,082 A | 2/1999 | Van Zeeland |
| 5,943,233 A | 8/1999 | Ebina |
| 5,953,001 A | 9/1999 | Challener et al. |
| 5,960,366 A | 9/1999 | Duwaer et al. |
| 5,963,332 A | 10/1999 | Feldman et al. |
| 5,999,168 A | 12/1999 | Rosenberg et al. |
| 6,069,567 A | 5/2000 | Zawilski |
| 6,128,006 A | 10/2000 | Rosenberg et al. |
| 6,134,189 A | 10/2000 | Carrard |
| 6,154,201 A | 11/2000 | Levin et al. |
| 6,175,679 B1 | 1/2001 | Veligdan et al. |
| 6,203,190 B1 | 3/2001 | Stotz |
| 6,241,684 B1 | 6/2001 | Amano |
| 6,246,050 B1 | 6/2001 | Tullis et al. |
| 6,252,825 B1 | 6/2001 | Perotto |
| 6,304,247 B1 | 10/2001 | Black |
| 6,355,891 B1 | 3/2002 | Ikunami |
| 6,361,502 B1 | 3/2002 | Puolakanaho et al. |
| 6,377,239 B1 | 4/2002 | Isikawa |
| 6,392,640 B1 | 5/2002 | Will |
| 6,396,006 B1 | 5/2002 | Yokoji et al. |
| 6,422,740 B1 | 7/2002 | Leuenberger |
| 6,477,117 B1 | 11/2002 | Narayanaswami et al. |
| 6,502,982 B1 | 1/2003 | Bach et al. |
| 6,525,278 B2 | 2/2003 | Villain et al. |
| 6,556,222 B1 | 4/2003 | Narayanaswami |
| 6,575,618 B1 | 6/2003 | Inoue et al. |
| 6,587,400 B1 | 7/2003 | Line |
| 6,636,197 B1 | 10/2003 | Goldenberg et al. |
| 6,646,635 B2 | 11/2003 | Pogatetz et al. |
| 6,661,438 B1 | 11/2003 | Shiraishi et al. |
| 6,672,758 B2 | 1/2004 | Ehrsam et al. |
| 6,794,992 B1 | 9/2004 | Rogers |
| 6,809,275 B1 | 10/2004 | Cheng et al. |
| 6,834,430 B2 | 12/2004 | Worrell |
| 6,846,998 B2 | 1/2005 | Hasumi et al. |
| 6,882,596 B2 | 4/2005 | Guanter |
| 6,888,076 B2 | 5/2005 | Hetherington |
| 6,896,403 B1 | 5/2005 | Gau |
| 6,909,378 B1 | 6/2005 | Lambrechts et al. |
| 6,914,551 B2 | 7/2005 | Vidal |
| 6,961,099 B2 | 11/2005 | Takano et al. |
| 6,963,039 B1 | 11/2005 | Weng et al. |
| 6,967,903 B2 | 11/2005 | Guanter |
| 6,977,868 B2 | 12/2005 | Brewer et al. |
| 6,982,930 B1 | 1/2006 | Hung |
| 6,985,107 B2 | 1/2006 | Anson |
| 6,987,568 B2 | 1/2006 | Dana |
| 6,998,553 B2 | 2/2006 | Hisamune et al. |
| 7,016,263 B2 | 3/2006 | Gueissaz et al. |
| 7,021,442 B2 | 4/2006 | Borgerson |
| 7,031,228 B2 | 4/2006 | Born et al. |
| 7,034,237 B2 | 4/2006 | Ferri et al. |
| 7,081,905 B1 | 7/2006 | Raghunath et al. |
| 7,102,626 B2 | 9/2006 | Denny, III |
| 7,111,365 B1 | 9/2006 | Howie, Jr. |
| 7,113,450 B2 | 9/2006 | Plancon et al. |
| 7,119,289 B2 | 10/2006 | Lacroix |
| 7,135,673 B2 | 11/2006 | Saint Clair |
| 7,167,083 B2 | 1/2007 | Giles |
| 7,244,927 B2 | 7/2007 | Huynh |
| 7,255,473 B2 | 8/2007 | Hiranuma et al. |
| 7,265,336 B2 | 9/2007 | Hataguchi et al. |

(56) References Cited

U.S. PATENT DOCUMENTS

| | | |
|---|---|---|
| 7,274,303 B2 | 9/2007 | Dresti et al. |
| 7,285,738 B2 | 10/2007 | Lavigne et al. |
| 7,286,063 B2 | 10/2007 | Gauthey |
| 7,292,741 B2 | 11/2007 | Ishiyama et al. |
| 7,358,481 B2 | 4/2008 | Yeoh et al. |
| 7,369,308 B2 | 5/2008 | Tsuruta et al. |
| 7,371,745 B2 | 5/2008 | Ebright et al. |
| 7,385,874 B2 | 6/2008 | Vuilleumier |
| 7,404,667 B2 | 7/2008 | Born et al. |
| 7,465,917 B2 | 12/2008 | Chin et al. |
| 7,468,036 B1 | 12/2008 | Rulkov et al. |
| 7,506,269 B2 | 3/2009 | Lang et al. |
| 7,520,664 B2 | 4/2009 | Wai |
| 7,528,824 B2 | 5/2009 | Kong |
| 7,545,367 B2 | 6/2009 | Sunda et al. |
| 7,591,582 B2 | 9/2009 | Hiranuma et al. |
| 7,593,755 B2 | 9/2009 | Colando et al. |
| 7,605,846 B2 | 10/2009 | Watanabe |
| 7,634,263 B2 | 12/2009 | Louch et al. |
| 7,646,677 B2 | 1/2010 | Nakamura |
| 7,655,874 B2 | 2/2010 | Akieda |
| 7,682,070 B2 | 3/2010 | Burton |
| 7,708,457 B2 | 5/2010 | Girardin |
| 7,710,456 B2 | 5/2010 | Koshiba et al. |
| 7,732,724 B2 | 6/2010 | Otani et al. |
| 7,761,246 B2 | 7/2010 | Matsui |
| 7,763,819 B2 | 7/2010 | Ieda et al. |
| 7,772,507 B2 | 8/2010 | Orr |
| 7,778,115 B2 | 8/2010 | Ruchonnet |
| 7,781,726 B2 | 8/2010 | Matsui et al. |
| RE41,637 E | 9/2010 | O'Hara et al. |
| 7,791,587 B2 | 9/2010 | Kosugi |
| 7,791,588 B2 | 9/2010 | Tierling et al. |
| 7,791,597 B2 | 9/2010 | Silverstein et al. |
| 7,822,469 B2 | 10/2010 | Lo |
| 7,856,255 B2 | 12/2010 | Tsuchiya et al. |
| 7,858,583 B2 | 12/2010 | Schmidt et al. |
| 7,865,324 B2 | 1/2011 | Lindberg |
| 7,894,957 B2 | 2/2011 | Carlson |
| 7,946,758 B2 | 5/2011 | Mooring |
| 8,063,892 B2 | 11/2011 | Shahoian et al. |
| 8,138,488 B2 | 3/2012 | Grot |
| 8,143,981 B2 | 3/2012 | Washizu et al. |
| 8,167,126 B2 | 5/2012 | Stiehl |
| 8,169,402 B2 | 5/2012 | Shahoian et al. |
| 8,188,989 B2 | 5/2012 | Levin et al. |
| 8,195,313 B1 | 6/2012 | Fadell et al. |
| 8,229,535 B2 | 7/2012 | Mensinger et al. |
| 8,248,815 B2 | 8/2012 | Yang et al. |
| 8,263,886 B2 | 9/2012 | Lin et al. |
| 8,263,889 B2 | 9/2012 | Takahashi et al. |
| 8,275,327 B2 | 9/2012 | Yi et al. |
| 8,294,670 B2 | 10/2012 | Griffin et al. |
| 8,312,495 B2 | 11/2012 | Vanderhoff |
| 8,318,340 B2 | 11/2012 | Stimits |
| 8,368,677 B2 | 2/2013 | Yamamoto |
| 8,371,745 B2 | 2/2013 | Manni |
| 8,373,661 B2 | 2/2013 | Lan et al. |
| 8,405,618 B2 | 3/2013 | Colgate |
| 8,410,971 B2 | 4/2013 | Friedlander |
| 8,432,368 B2 | 4/2013 | Momeyer et al. |
| 8,439,559 B2 | 5/2013 | Luk et al. |
| 8,441,450 B2 | 5/2013 | Degner et al. |
| 8,446,713 B2 | 5/2013 | Lai |
| 8,456,430 B2 | 6/2013 | Oliver et al. |
| 8,477,118 B2 | 7/2013 | Lan et al. |
| 8,493,190 B2 | 7/2013 | Periquet et al. |
| 8,508,511 B2 | 8/2013 | Tanaka et al. |
| 8,525,777 B2 | 9/2013 | Stavely et al. |
| 8,562,489 B2 | 10/2013 | Burton et al. |
| 8,568,313 B2 | 10/2013 | Sadhu |
| 8,576,044 B2 | 11/2013 | Chapman |
| 8,593,598 B2 | 11/2013 | Chen et al. |
| 8,607,662 B2 | 12/2013 | Huang |
| 8,614,881 B2 | 12/2013 | Yoe |
| 8,666,682 B2 | 3/2014 | LaVigne et al. |
| 8,677,285 B2 | 3/2014 | Tsern et al. |
| 8,704,787 B2 | 4/2014 | Yamamoto |
| 8,711,093 B2 | 4/2014 | Ong et al. |
| 8,724,087 B2 | 5/2014 | Van De Kerkhof et al. |
| 8,730,167 B2 | 5/2014 | Ming et al. |
| 8,743,088 B2 | 6/2014 | Watanabe |
| 8,783,944 B2 | 7/2014 | Doi |
| 8,797,153 B2 | 8/2014 | Vanhelle et al. |
| 8,804,993 B2 | 8/2014 | Shukla et al. |
| 8,816,962 B2 | 8/2014 | Obermeyer et al. |
| 8,824,245 B2 | 9/2014 | Lau et al. |
| 8,847,741 B2 | 9/2014 | Birnbaum et al. |
| 8,851,372 B2 | 10/2014 | Zhou |
| 8,859,971 B2 | 10/2014 | Weber |
| 8,860,674 B2 | 10/2014 | Lee et al. |
| 8,863,219 B2 | 10/2014 | Brown et al. |
| D717,679 S | 11/2014 | Anderssen |
| 8,878,657 B2 | 11/2014 | Periquet et al. |
| 8,885,856 B2 | 11/2014 | Sacha |
| 8,895,911 B2 | 11/2014 | Takahashi |
| 8,905,631 B2 | 12/2014 | Sakurazawa et al. |
| 8,908,477 B2 | 12/2014 | Peters |
| 8,920,022 B2 | 12/2014 | Ishida et al. |
| 8,922,399 B2 | 12/2014 | Bajaj et al. |
| 8,928,452 B2 | 1/2015 | Kim et al. |
| 8,948,832 B2 | 2/2015 | Hong et al. |
| 8,954,135 B2 | 2/2015 | Yuen et al. |
| 8,975,543 B2 | 3/2015 | Hakemeyer |
| 8,994,827 B2 | 3/2015 | Mistry et al. |
| 9,001,625 B2 | 4/2015 | Essery et al. |
| 9,024,733 B2 | 5/2015 | Wouters |
| 9,028,134 B2 | 5/2015 | Koshoji et al. |
| 9,030,446 B2 | 5/2015 | Mistry et al. |
| 9,034,666 B2 | 5/2015 | Vaganov et al. |
| 9,039,614 B2 | 5/2015 | Yuen et al. |
| 9,041,663 B2 | 5/2015 | Westerman |
| 9,042,971 B2 | 5/2015 | Brumback et al. |
| 9,049,998 B2 | 6/2015 | Brumback et al. |
| 9,052,696 B2 | 6/2015 | Breuillot et al. |
| 9,086,717 B2 | 7/2015 | Meerovitsch |
| 9,086,738 B2 | 7/2015 | Leung et al. |
| 9,100,493 B1 | 8/2015 | Zhou |
| 9,101,184 B2 | 8/2015 | Wilson |
| 9,105,413 B2 | 8/2015 | Hiranuma et al. |
| 9,123,483 B2 | 9/2015 | Ferri et al. |
| 9,134,807 B2 | 9/2015 | Shaw et al. |
| 9,141,087 B2 | 9/2015 | Brown et al. |
| 9,176,577 B2 | 11/2015 | Jangaard et al. |
| 9,176,598 B2 | 11/2015 | Sweetser et al. |
| 9,202,372 B2 | 12/2015 | Reams et al. |
| 9,213,409 B2 | 12/2015 | Redelsheimer et al. |
| 9,223,296 B2 | 12/2015 | Yang et al. |
| 9,241,635 B2 | 1/2016 | Yuen et al. |
| 9,244,438 B2 | 1/2016 | Hoover et al. |
| 9,256,209 B2 | 2/2016 | Yang et al. |
| 9,277,156 B2 | 3/2016 | Bennett et al. |
| 9,350,850 B2 | 5/2016 | Pope et al. |
| 9,367,146 B2 | 6/2016 | Piot |
| 9,386,932 B2 | 7/2016 | Chatterjee et al. |
| 9,426,275 B2 | 8/2016 | Eim et al. |
| 9,430,042 B2 | 8/2016 | Levin |
| 9,437,357 B2 | 9/2016 | Furuki et al. |
| 9,449,770 B2 | 9/2016 | Sanford et al. |
| 9,501,044 B2 | 11/2016 | Jackson et al. |
| 9,520,100 B2 | 12/2016 | Houjou et al. |
| 9,532,723 B2 | 1/2017 | Kim |
| 9,542,016 B2 | 1/2017 | Armstrong-Muntner |
| 9,545,541 B2 | 1/2017 | Aragones et al. |
| 9,552,023 B2 | 1/2017 | Joo et al. |
| 9,599,964 B2 | 3/2017 | Gracia |
| 9,607,505 B2 | 3/2017 | Rothkopf et al. |
| 9,620,312 B2 | 4/2017 | Ely et al. |
| 9,627,163 B2 | 4/2017 | Ely |
| 9,632,318 B2 | 4/2017 | Goto et al. |
| 9,638,587 B2 | 5/2017 | Marquas et al. |
| 9,651,922 B2 | 5/2017 | Hysek et al. |
| 9,659,482 B2 | 5/2017 | Yang et al. |
| 9,680,831 B2 | 6/2017 | Jooste et al. |

(56) References Cited

U.S. PATENT DOCUMENTS

| | | |
|---|---|---|
| 9,709,956 B1 | 7/2017 | Ely et al. |
| 9,753,436 B2 | 9/2017 | Ely et al. |
| D800,172 S | 10/2017 | Akana |
| 9,800,717 B2 | 10/2017 | Ma et al. |
| 9,836,025 B2 | 12/2017 | Ely et al. |
| 9,873,711 B2 | 1/2018 | Hoover et al. |
| 9,874,945 B2 | 1/2018 | Fukumoto |
| 9,886,006 B2 | 2/2018 | Ely et al. |
| 9,891,590 B2 | 2/2018 | Shim et al. |
| 9,891,651 B2 | 2/2018 | Jackson et al. |
| 9,898,032 B2 | 2/2018 | Hafez et al. |
| 9,927,902 B2 | 3/2018 | Burr et al. |
| 9,939,923 B2 | 4/2018 | Sharma |
| 9,946,297 B2 | 4/2018 | Nazzaro et al. |
| 9,952,558 B2 | 4/2018 | Ely |
| 9,952,682 B2 | 4/2018 | Zhang et al. |
| 9,971,305 B2 | 5/2018 | Ely et al. |
| 9,971,405 B2 | 5/2018 | Holenarsipur et al. |
| 9,971,407 B2 | 5/2018 | Holenarsipur et al. |
| 9,979,426 B2 | 5/2018 | Na et al. |
| 10,001,817 B2 | 6/2018 | Zambetti et al. |
| 10,012,550 B2 | 7/2018 | Yang |
| 10,018,966 B2 | 7/2018 | Ely et al. |
| 10,019,097 B2 | 7/2018 | Ely et al. |
| 10,037,006 B2 | 7/2018 | Ely |
| 10,037,081 B2 | 7/2018 | Grant |
| 10,048,802 B2 | 8/2018 | Shedletsky |
| 10,061,399 B2 | 8/2018 | Bushnell et al. |
| 10,066,970 B2 | 9/2018 | Gowreesunker et al. |
| 10,092,203 B2 | 10/2018 | Mirov |
| 10,108,016 B2 | 10/2018 | Bosveld |
| 10,114,342 B2 | 10/2018 | Kim et al. |
| 10,145,711 B2 | 12/2018 | Boonsom et al. |
| 10,175,652 B2 | 1/2019 | Ely et al. |
| 10,190,891 B1 | 1/2019 | Rothkopf et al. |
| 10,203,662 B1 | 2/2019 | Lin et al. |
| 10,209,148 B2 | 2/2019 | Lyon et al. |
| 10,216,147 B2 | 2/2019 | Ely et al. |
| 10,222,756 B2 | 3/2019 | Ely et al. |
| 10,222,909 B2 | 3/2019 | Shedletsky et al. |
| 10,234,828 B2 | 3/2019 | Ely et al. |
| 10,241,593 B2 | 3/2019 | Chen |
| 10,296,125 B2 | 5/2019 | Ely et al. |
| 10,331,081 B2 | 6/2019 | Ely et al. |
| 10,331,082 B2 | 6/2019 | Ely et al. |
| 10,353,487 B2 | 7/2019 | Chung et al. |
| 10,379,629 B2 | 8/2019 | Bushnell et al. |
| 10,386,940 B2 | 8/2019 | Kim |
| 10,401,961 B2 | 9/2019 | Cruz-Hernandez et al. |
| 10,429,959 B2 | 10/2019 | Battlogg |
| 10,474,194 B1 | 11/2019 | Ell et al. |
| 10,503,258 B2 | 12/2019 | Holenarsipur et al. |
| 10,509,486 B2 | 12/2019 | Bushnell et al. |
| 10,524,671 B2 | 1/2020 | Lamego |
| 10,534,320 B2 | 1/2020 | Ferri et al. |
| 10,551,798 B1 | 2/2020 | Bushnell et al. |
| 10,572,053 B2 | 2/2020 | Ely et al. |
| 10,599,101 B2 | 3/2020 | Rothkopf et al. |
| 10,613,685 B2 | 4/2020 | Shedletsky |
| 10,664,074 B2 | 5/2020 | Moussette et al. |
| 10,732,571 B2 | 8/2020 | Ely et al. |
| 10,845,764 B2 | 11/2020 | Ely et al. |
| 10,852,700 B2 | 12/2020 | Abramov |
| 10,852,855 B2 | 12/2020 | Niu |
| 10,871,385 B2 | 12/2020 | Kok |
| 10,936,071 B2 | 3/2021 | Pandya et al. |
| 10,987,054 B2 | 4/2021 | Pandya et al. |
| 11,029,831 B2 | 6/2021 | Block et al. |
| 2003/0174590 A1 | 9/2003 | Arikawa et al. |
| 2004/0047244 A1 | 3/2004 | Iino et al. |
| 2004/0082414 A1 | 4/2004 | Knox |
| 2004/0130971 A1 | 7/2004 | Ecoffet et al. |
| 2004/0264301 A1 | 12/2004 | Howard et al. |
| 2005/0075558 A1 | 4/2005 | Vecerina et al. |
| 2005/0088417 A1 | 4/2005 | Mulligan |
| 2006/0250377 A1 | 11/2006 | Zadesky et al. |
| 2007/0013775 A1 | 1/2007 | Shin |
| 2007/0050054 A1 | 3/2007 | Sambandam Guruparan et al. |
| 2007/0182708 A1 | 8/2007 | Poupyrev et al. |
| 2007/0211042 A1 | 9/2007 | Kim et al. |
| 2007/0222756 A1 | 9/2007 | Wu et al. |
| 2007/0229671 A1 | 10/2007 | Takeshita et al. |
| 2007/0247421 A1 | 10/2007 | Orsley et al. |
| 2008/0130914 A1 | 6/2008 | Cho |
| 2009/0051649 A1 | 2/2009 | Rondel |
| 2009/0073119 A1 | 3/2009 | Le et al. |
| 2009/0122656 A1 | 5/2009 | Bonnet et al. |
| 2009/0146975 A1 | 6/2009 | Chang |
| 2009/0152452 A1 | 6/2009 | Lee et al. |
| 2009/0217207 A1 | 8/2009 | Kagermeier et al. |
| 2009/0285443 A1 | 11/2009 | Camp et al. |
| 2009/0312051 A1 | 12/2009 | Hansson et al. |
| 2010/0033430 A1 | 2/2010 | Kakutani et al. |
| 2010/0053468 A1 | 3/2010 | Havrill |
| 2010/0081375 A1 | 4/2010 | Rosenblatt et al. |
| 2010/0149099 A1 | 6/2010 | Elias |
| 2011/0007468 A1 | 1/2011 | Burton et al. |
| 2011/0090148 A1 | 4/2011 | Li et al. |
| 2011/0158057 A1 | 6/2011 | Brewer et al. |
| 2011/0242064 A1 | 10/2011 | Ono et al. |
| 2011/0270358 A1 | 11/2011 | Davis et al. |
| 2012/0067711 A1 | 3/2012 | Yang |
| 2012/0068857 A1 | 3/2012 | Rothkopf et al. |
| 2012/0075082 A1 | 3/2012 | Rothkopf et al. |
| 2012/0112859 A1 | 5/2012 | Park et al. |
| 2012/0113044 A1 | 5/2012 | Strazisar et al. |
| 2012/0206248 A1 | 8/2012 | Biggs |
| 2012/0272784 A1 | 11/2012 | Bailey et al. |
| 2013/0037396 A1 | 2/2013 | Yu |
| 2013/0087443 A1 | 4/2013 | Kikuchi |
| 2013/0191220 A1 | 7/2013 | Dent et al. |
| 2013/0235704 A1 | 9/2013 | Grinberg |
| 2013/0261405 A1 | 10/2013 | Lee et al. |
| 2013/0335196 A1 | 12/2013 | Zhang et al. |
| 2014/0009397 A1 | 1/2014 | Gillespie |
| 2014/0045547 A1 | 2/2014 | Singamsetty et al. |
| 2014/0071098 A1 | 3/2014 | You |
| 2014/0073486 A1 | 3/2014 | Ahmed et al. |
| 2014/0132516 A1 | 5/2014 | Tsai et al. |
| 2014/0197936 A1 | 7/2014 | Biggs et al. |
| 2014/0340318 A1 | 11/2014 | Stringer et al. |
| 2014/0347289 A1 | 11/2014 | Suh et al. |
| 2014/0368442 A1 | 12/2014 | Vahtola |
| 2014/0375579 A1 | 12/2014 | Fujiwara |
| 2015/0049059 A1 | 2/2015 | Zadesky et al. |
| 2015/0098309 A1 | 4/2015 | Adams et al. |
| 2015/0124415 A1 | 5/2015 | Goyal et al. |
| 2015/0186609 A1 | 7/2015 | Utter, II |
| 2015/0221460 A1 | 8/2015 | Teplitxky et al. |
| 2015/0293592 A1 | 10/2015 | Cheong |
| 2015/0320346 A1 | 11/2015 | Chen |
| 2015/0338642 A1 | 11/2015 | Sanford |
| 2015/0366098 A1 | 12/2015 | Lapetina et al. |
| 2016/0018846 A1 | 1/2016 | Zenoff |
| 2016/0054813 A1 | 2/2016 | Shediwy et al. |
| 2016/0058375 A1 | 3/2016 | Rothkopf et al. |
| 2016/0061636 A1 | 3/2016 | Gowreesunker et al. |
| 2016/0062623 A1 | 3/2016 | Howard et al. |
| 2016/0069713 A1 | 3/2016 | Ruh et al. |
| 2016/0109861 A1 | 4/2016 | Kim et al. |
| 2016/0116306 A1 | 4/2016 | Ferri et al. |
| 2016/0147432 A1 | 5/2016 | Shi et al. |
| 2016/0170598 A1 | 6/2016 | Zambetti et al. |
| 2016/0170608 A1 | 6/2016 | Zambetti et al. |
| 2016/0170624 A1 | 6/2016 | Zambetti et al. |
| 2016/0241688 A1 | 8/2016 | Vossoughi |
| 2016/0253287 A1 | 9/2016 | Sarkar et al. |
| 2016/0306446 A1 | 10/2016 | Chung et al. |
| 2016/0320583 A1 | 11/2016 | Hall, Jr. |
| 2016/0327911 A1 | 11/2016 | Eim et al. |
| 2016/0338642 A1 | 11/2016 | Parara et al. |
| 2016/0378069 A1 | 12/2016 | Rothkopf et al. |
| 2016/0378070 A1 | 12/2016 | Rothkopf et al. |
| 2016/0378071 A1 | 12/2016 | Rothkopf et al. |

(56) References Cited

U.S. PATENT DOCUMENTS

| | | | |
|---|---|---|---|
| 2017/0011210 A1 | 1/2017 | Cheong et al. |
| 2017/0027461 A1 | 2/2017 | Shin et al. |
| 2017/0031449 A1 | 2/2017 | Karsten et al. |
| 2017/0045958 A1 | 2/2017 | Battlogg et al. |
| 2017/0061863 A1 | 3/2017 | Eguchi |
| 2017/0069443 A1 | 3/2017 | Wang et al. |
| 2017/0069444 A1 | 3/2017 | Wang et al. |
| 2017/0069447 A1 | 3/2017 | Wang et al. |
| 2017/0090599 A1 | 3/2017 | Kuboyama |
| 2017/0104902 A1 | 4/2017 | Kim et al. |
| 2017/0139489 A1 | 5/2017 | Chen et al. |
| 2017/0216519 A1 | 8/2017 | Vouillamoz |
| 2017/0216668 A1 | 8/2017 | Burton et al. |
| 2017/0238138 A1 | 8/2017 | Aminzade |
| 2017/0251561 A1 | 8/2017 | Fleck et al. |
| 2017/0269715 A1 | 9/2017 | Kim et al. |
| 2017/0285404 A1 | 10/2017 | Kubota et al. |
| 2017/0301314 A1 | 10/2017 | Kim et al. |
| 2017/0307414 A1 | 10/2017 | Ferri et al. |
| 2017/0331869 A1 | 11/2017 | Bendahan et al. |
| 2017/0357465 A1 | 12/2017 | Dzeryn et al. |
| 2018/0018026 A1 | 1/2018 | Bushnell et al. |
| 2018/0136686 A1 | 5/2018 | Jackson et al. |
| 2018/0196517 A1 | 7/2018 | Tan et al. |
| 2018/0225701 A1 | 8/2018 | Han |
| 2018/0235491 A1 | 8/2018 | Bayley et al. |
| 2018/0239306 A1 | 8/2018 | Ely |
| 2018/0337551 A1 | 11/2018 | Park |
| 2019/0017846 A1 | 1/2019 | Boonsom et al. |
| 2019/0072911 A1 | 3/2019 | Ely et al. |
| 2019/0072912 A1 | 3/2019 | Pandya et al. |
| 2019/0163324 A1 | 5/2019 | Shedletsky |
| 2019/0250754 A1 | 8/2019 | Ely et al. |
| 2019/0278232 A1 | 9/2019 | Ely et al. |
| 2019/0317454 A1 | 10/2019 | Holenarsipur et al. |
| 2019/0391539 A1 | 12/2019 | Perkins et al. |
| 2020/0041962 A1 | 2/2020 | Beyhs |
| 2020/0064774 A1 | 2/2020 | Ely et al. |
| 2020/0064779 A1 | 2/2020 | Pandya et al. |
| 2020/0073339 A1 | 3/2020 | Roach et al. |
| 2020/0110473 A1 | 4/2020 | Bushnell et al. |
| 2020/0159172 A1 | 5/2020 | Bushnell et al. |
| 2020/0233380 A1 | 7/2020 | Rothkopf |
| 2020/0233529 A1 | 7/2020 | Shedletsky et al. |
| 2020/0271483 A1 | 8/2020 | Boonsom |
| 2020/0326659 A1 | 10/2020 | Ely et al. |
| 2021/0181682 A1 | 6/2021 | Ely et al. |
| 2021/0181688 A1 | 6/2021 | Ely et al. |
| 2021/0181690 A1 | 6/2021 | Rothkopf et al. |
| 2021/0181691 A1 | 6/2021 | Rothkopf et al. |
| 2021/0181692 A1 | 6/2021 | Rothkopf et al. |
| 2021/0181865 A1 | 6/2021 | Bushnell et al. |
| 2021/0255590 A1 | 8/2021 | Ely et al. |

FOREIGN PATENT DOCUMENTS

| | | |
|---|---|---|
| CN | 1445627 | 10/2003 |
| CN | 1504843 | 6/2004 |
| CN | 1601408 | 3/2005 |
| CN | 1624427 | 6/2005 |
| CN | 1792295 | 6/2006 |
| CN | 1825224 | 8/2006 |
| CN | 101035148 | 9/2007 |
| CN | 101201587 | 6/2008 |
| CN | 201081979 | 7/2008 |
| CN | 101404928 | 4/2009 |
| CN | 201262741 | 6/2009 |
| CN | 101750958 | 6/2010 |
| CN | 201638168 | 11/2010 |
| CN | 101923314 | 12/2010 |
| CN | 102216959 | 10/2011 |
| CN | 202008579 | 10/2011 |
| CN | 102590925 | 7/2012 |
| CN | 102890443 | 1/2013 |
| CN | 202710937 | 1/2013 |
| CN | 103177891 | 6/2013 |
| CN | 103191557 | 7/2013 |
| CN | 103253067 | 8/2013 |
| CN | 103645804 | 3/2014 |
| CN | 203564224 | 4/2014 |
| CN | 103852090 | 6/2014 |
| CN | 203630524 | 6/2014 |
| CN | 103956006 | 7/2014 |
| CN | 203693601 | 7/2014 |
| CN | 203705837 | 7/2014 |
| CN | 203732900 | 7/2014 |
| CN | 103995456 | 8/2014 |
| CN | 104020660 | 9/2014 |
| CN | 203941395 | 11/2014 |
| CN | 104777987 | 4/2015 |
| CN | 104685794 | 6/2015 |
| CN | 204479929 | 7/2015 |
| CN | 204496177 | 7/2015 |
| CN | 104880937 | 9/2015 |
| CN | 104898406 | 9/2015 |
| CN | 204650147 | 9/2015 |
| CN | 105022947 | 11/2015 |
| CN | 105096979 | 11/2015 |
| CN | 105339871 | 2/2016 |
| CN | 105547146 | 5/2016 |
| CN | 105556433 | 5/2016 |
| CN | 105683876 | 6/2016 |
| CN | 105760067 | 7/2016 |
| CN | 105955519 | 9/2016 |
| CN | 205645648 | 10/2016 |
| CN | 205721636 | 11/2016 |
| CN | 205750744 | 11/2016 |
| CN | 106236051 | 12/2016 |
| CN | 106557218 | 4/2017 |
| CN | 206147524 | 5/2017 |
| CN | 206209589 | 5/2017 |
| CN | 107111342 | 8/2017 |
| CN | 107122088 | 9/2017 |
| CN | 107966895 | 4/2018 |
| CN | 209560397 | 10/2019 |
| DE | 3706194 | 9/1988 |
| DE | 102008023651 | 11/2009 |
| DE | 102016215087 | 3/2017 |
| EP | 0556155 | 8/1993 |
| EP | 1345095 | 9/2003 |
| EP | 1519452 | 3/2005 |
| EP | 1669724 | 6/2006 |
| EP | 1832969 | 9/2007 |
| EP | 2375295 | 10/2011 |
| EP | 2579186 | 4/2013 |
| EP | 2720129 | 4/2014 |
| EP | 2884239 | 6/2015 |
| FR | 2030093 | 10/1970 |
| FR | 2801402 | 5/2001 |
| GB | 2433211 | 6/2007 |
| JP | S52151058 | 12/1977 |
| JP | S52164551 | 12/1977 |
| JP | S53093067 | 8/1978 |
| JP | S54087779 | 6/1979 |
| JP | S5708582 | 1/1982 |
| JP | S5734457 | 2/1982 |
| JP | S60103936 | 6/1985 |
| JP | S60103937 | 6/1985 |
| JP | H02285214 | 11/1990 |
| JP | H04093719 | 3/1992 |
| JP | H04157319 | 5/1992 |
| JP | H05203465 | 8/1993 |
| JP | H05312595 | 11/1993 |
| JP | H06050927 | 12/1994 |
| JP | H06331761 | 12/1994 |
| JP | H06347293 | 12/1994 |
| JP | H07116141 | 5/1995 |
| JP | H0914941 | 1/1997 |
| JP | H10161811 | 6/1998 |
| JP | H11121210 | 4/1999 |
| JP | H11191508 | 7/1999 |
| JP | 2000258559 | 9/2000 |
| JP | 2000316824 | 11/2000 |
| JP | 2000337892 | 12/2000 |

(56) References Cited

FOREIGN PATENT DOCUMENTS

| | | |
|---|---|---|
| JP | 2001084934 | 3/2001 |
| JP | 2001167651 | 6/2001 |
| JP | 2001202178 | 7/2001 |
| JP | 2001524206 | 11/2001 |
| JP | 2002071480 | 3/2002 |
| JP | 2002165768 | 6/2002 |
| JP | 2003050668 | 2/2003 |
| JP | 2003151410 | 5/2003 |
| JP | 2003331693 | 11/2003 |
| JP | 2004184396 | 7/2004 |
| JP | 2005017011 | 1/2005 |
| JP | 2005063200 | 3/2005 |
| JP | 2005099023 | 4/2005 |
| JP | 2005108630 | 4/2005 |
| JP | 2006164275 | 6/2006 |
| JP | 3852854 | 12/2006 |
| JP | 2007101380 | 4/2007 |
| JP | 2007149620 | 6/2007 |
| JP | 2007248176 | 9/2007 |
| JP | 2007311153 | 11/2007 |
| JP | 2008053980 | 3/2008 |
| JP | 2008122124 | 5/2008 |
| JP | 2008122377 | 5/2008 |
| JP | 2008170436 | 7/2008 |
| JP | 2008235226 | 10/2008 |
| JP | 2009009382 | 1/2009 |
| JP | 2009070657 | 4/2009 |
| JP | 2009519737 | 5/2009 |
| JP | 2009540399 | 11/2009 |
| JP | 2010032545 | 2/2010 |
| JP | 2010515153 | 5/2010 |
| JP | 2010165001 | 7/2010 |
| JP | 2010186572 | 8/2010 |
| JP | 2010243344 | 10/2010 |
| JP | 2010244797 | 10/2010 |
| JP | 2011021929 | 2/2011 |
| JP | 2011165468 | 8/2011 |
| JP | 2011221659 | 11/2011 |
| JP | 2013057516 | 3/2013 |
| JP | 2013079961 | 5/2013 |
| JP | 2013524189 | 6/2013 |
| JP | 3190075 | 4/2014 |
| JP | 5477393 | 4/2014 |
| JP | 2014512556 | 5/2014 |
| JP | 2014174031 | 9/2014 |
| JP | 2018510451 | 4/2018 |
| KR | 20010030477 | 4/2001 |
| KR | 200278568 | 3/2002 |
| KR | 20070011685 | 1/2007 |
| KR | 20070014247 | 2/2007 |
| KR | 100754674 | 9/2007 |
| KR | 20080045397 | 5/2008 |
| KR | 2020100007563 | 7/2010 |
| KR | 20110011393 | 2/2011 |
| KR | 20110012784 | 2/2011 |
| KR | 20110113368 | 10/2011 |
| KR | 20130036038 | 4/2013 |
| KR | 20130131873 | 12/2013 |
| KR | 20140051391 | 4/2014 |
| KR | 20140104388 | 8/2014 |
| KR | 20160017070 | 2/2016 |
| KR | 20160048967 | 5/2016 |
| NL | 1040225 | 11/2014 |
| RO | 129033 | 11/2013 |
| TW | 200633681 | 10/2006 |
| WO | WO2001/022038 | 3/2001 |
| WO | WO2001/069567 | 9/2001 |
| WO | WO2003/032538 | 4/2003 |
| WO | WO2010/058376 | 5/2010 |
| WO | WO2012/083380 | 6/2012 |
| WO | WO2012/094805 | 7/2012 |
| WO | WO2014/018118 | 1/2014 |
| WO | WO2014/200766 | 12/2014 |
| WO | WO2015/147756 | 10/2015 |
| WO | WO2016080669 | 5/2016 |
| WO | WO2016/104922 | 6/2016 |
| WO | WO2016/155761 | 10/2016 |
| WO | WO2016196171 | 12/2016 |
| WO | WO2016208835 | 12/2016 |
| WO | WO2017/013278 | 1/2017 |
| WO | WO2020173085 | 9/2020 |

OTHER PUBLICATIONS

Author Unknown, "Fossil Q ups smartwatch game with handsome design and build," Business Mirror, Makati City, Philippines, 3 pages, Dec. 20, 2016.

Author Unknown, "How Vesag Helps Kids Women and Visitors," http://www.sooperarticles.com/health-fitness-articles/children-health-articles/how-vesag-helps-kids-women-visitors-218542.html, 2 pages, at least as early as May 20, 2015.

Author Unknown, "mHealth," http://mhealth.vesag.com/?m=201012, 7 pages, Dec. 23, 2010.

Author Unknown, "mHealth Summit 2010," http://www.virtualpressoffice.com/eventsSubmenu.do?page=exhibitorPage&showId=1551&companyId=5394, 5 pages, Nov. 18, 2010.

Author Unknown, "MyKronoz ZeTime: World's Most Funded Hybrid Smartwatch Raised over $3M on Kickstarter, Running until Apr. 27," Business Wire, New York, New York, 3 pages, Apr. 21, 2017.

Author Unknown, "RedEye mini Plug-in Universal Remote Adapter for iPhone, iPod touch and iPad," Amazon.com, 4 pages, date unknown.

Author Unknown, "Re iPhone Universal Remote Control—Infrared Remote Control Accessory for iPhone and iPod touch," http://www.amazon.com/iPhone-Universal-Remote-Control-Accessory/dp/tech-data/B0038Z4 . . . , 2 pages, at least as early as Jul. 15, 2010.

Author Unknown, "Vesag Wrist Watch for Dementia Care from VYZIN," http://vyasa-kaaranam-ketkadey.blogspot.com/2011/03/vesag-wrist-watch-for-dementia-care.html, 2 pages, Mar. 31, 2011.

Author Unknown, "Vyzin Electronics Private Limited launches Vesag Watch," http://www.virtualpressoffice.com/showJointPage.do?page=jp&showId=1544, 5 pages, Jan. 6, 2011.

Author Unknown, "Vyzin Unveiled Personal Emergency Response System (PERS) with Remote Health Monitoring That Can Be Used for Entire Family," http://www.24-7pressrelease.com/press-release/vyzin-unveiled-personal-emergency-response-system-pers-with-remote-health-monitoring-that-can-be-used-for-entire-family-219317.php, 2 pages, Jun. 17, 2011.

Author Unknown, "DeskThorityNet, Optical Switch Keyboards," http://deskthority.net/keyboards-f2/optical-switch-keyboards-t1474.html, 22 pages, Jul. 11, 2015.

Epstein et al., "Economical, High-Performance Optical Encoders," Hewlett-Packard Journal, pp. 99-106, Oct. 1988. [text only version].

GreyB, "Google Watch: Convert your arm into a keyboard," http://www.whatafuture.com/2014/02/28/google-smartwatch/#sthash.Yk35cDXK.dpbs, 3 pages, Feb. 28, 2014.

IBM, "Additional Functionality Added to Cell Phone via "Learning" Function Button," www.ip.com, 2 pages, Feb. 21, 2007.

Kim, Joseph, "2010 mHealth Summit Emerges as Major One-Stop U.S. Venue for Mobile Health," http://www.medicineandtechnology.com/2010/08/2010-mhealth-summit-emerges-as-major.html, 3 pages, Aug. 26, 2010.

Krishnan et al., "A Miniature Surface Mount Reflective Optical Shaft Encoder," Hewlett-Packard Journal, Article 8, pp. 1-6, Dec. 1996.

Rick, "How VESAG Helps Health Conscious Citizens," http://sensetekgroup.com/2010/11/29/wireless-health-monitoring-system/, 2 pages, Nov. 29, 2010.

Sadhu, Rajendra, "How VESAG Helps People Who Want to 'Be There'?," http://ezinearticles.com/?How-Vesag-Helps-People-Who-Want-to-Be-There?&id-5423873, 1 page, Nov. 22, 2010.

Sadhu, Rajendra, "Mobile Innovation Helps Dementia and Alzheimer's Patients," http://www.itnewsafrica.com/2010/11/mobile-innovation-helps-dementia-andalzheimer%E2%80%99s-patients/, 3 pages, Nov. 22, 2010.

Sherr, Sol, "Input Devices," p. 55, Mar. 1988.

(56) References Cited

OTHER PUBLICATIONS

Tran et al., "Universal Programmable Remote Control/Telephone," www.ip.com, 2 pages, May 1, 1992.
Narayanaswami et al., "Challenges and considerations for the design and production of a purpose-optimized body-worn wristwatch computer," Defense, Security, and Cockpit Displays, 2004.
M.T. Raghunath et al., User Interfaces for Applications on a Wrist Watch, Personal and Ubiquitous Computing, vol. 6, No. 1, 2002, Springer.

REJECTION OF FALSE TURNS OF ROTARY INPUTS FOR ELECTRONIC DEVICES

CROSS-REFERENCE TO RELATED APPLICATIONS

This application is a continuation patent application of U.S. patent application Ser. No. 16/840,336, filed Apr. 4, 2020, and titled "Rejection of False Turns of Rotary Inputs for Electronic Devices," which is a continuation patent application of U.S. patent application Ser. No. 16/262,728, filed Jan. 30, 2019, and titled "Rejection of False Turns of Rotary Inputs for Electronic Devices," now U.S. Pat. No. 10,613,685, issued Apr. 7, 2020, which is a continuation patent application of U.S. patent application Ser. No. 16/048,081, filed Jul. 27, 2018 and titled "Rejection of False Turns of Rotary Inputs for Electronic Devices," now U.S. Pat. No. 10,222,909, issued Mar. 5, 2019, which is a continuation patent application of U.S. patent application Ser. No. 15/117,819, filed Aug. 10, 2016 and titled "Rejection of False Turns of Rotary Inputs for Electronic Devices," now U.S. Pat. No. 10,048,802, issued Aug. 14, 2018, which is a 35 U.S.C. § 371 application of PCT Patent Application No. PCT/US2014/016079, filed Feb. 12, 2014 and titled "Rejection of False Turns of Rotary Inputs for Electronic Devices," the disclosures of which are hereby incorporated herein by reference in their entireties.

TECHNICAL FIELD

The present disclosure relates generally to rotary input devices for electronic devices, and more particularly relates to rotary input devices for wearable electronic devices.

BACKGROUND

Electronic devices—such as wearable computing devices (e.g., watches), mobile devices, mobile phones, tablet computers, music and multi-media players, gaming devices, and other handheld, wearable or portable devices—have one or more inputs such as buttons, touch screens, switches, and rotary inputs that can perform various functions.

With some rotary inputs or rotary controls, the present inventors have recognized that there may be false inputs that are not intended by the user but occur when the rotary inputs are inadvertently or unintentionally moved by contact with clothing, portions of a user's arm or hand or other items.

For instance, as shown in FIGS. 1A-1B, with a wearable electronic device 20 in the form of a watch, rotary input(s) may be in the form of a crown 22 that rotates to provide input to and control of the wearable electronic device 20. Since this crown 22 is a user input, external to the device, it is possible during normal wear that the crown 22 will be turned without the user intending it be turned—for example, when a user puts their hand in their pocket or rotates their wrist into extension (FIG. 1A), hitting the crown 22 into their lower forearm 24 or the back of their hand 26 (FIG. 1A). FIG. 1C shows an electronic device 20 positioned on a user's body (represented by dashed lines 24, 26) that could be the user's arm or back of the user's hand. If such a rotary input 22 also wakes the electronic device 20 from a sleep mode and turns on the screen, these false turns may not only be distracting to the user, they may also waste battery charge of device 20 that could have been saved for intended interactions.

Rotational motion of the user's hand or arm—such as shown in FIG. 1B or when for instance the user is opening a door, unscrewing a jar lid, or the like—may also result in inadvertent, unintentional false turns of the crown 22 of the wearable electronic device 20.

Accordingly, as recognized by the present inventors, what is needed are mechanisms and processes for detecting and rejecting false, unintended rotations of rotary inputs of electronic devices.

SUMMARY

According to one broad aspect of one embodiment of the present disclosure, disclosed herein is an electronic device configured to differentiate between false turns of a rotary input device unintended by a user, and valid turns of the rotary input device intended by the user. In one example, an electronic device may include a processor; a rotary input coupled with the processor, the rotary input having a shaft connected with a crown, the rotary input providing rotary input turn data to the processor when the rotary input is rotated; and a module operating on the electronic device, the module determining whether the rotary input turn data from the rotary input is invalid data resulting from unintended rotations of the rotary input.

In one example, the module determines whether an amount of rotations of the rotary input is greater than a threshold amount of rotations, and if not, the input turn data is considered invalid data. In another example, the module determines whether a rate of rotations of the rotary input is greater than a threshold rate of rotations, and if not, the input turn data is considered invalid data.

In another example, the electronic device may include a shield extending from the housing, the shield positioned around a bottom portion of the crown. The shield can reduce inadvertent contact between the user's body (such as the user's arm or back of the hand) with the crown of the rotary input.

In another example, the electronic device may include the shaft being positioned on the housing along an axis that is positioned above a centerline of the housing. In this manner, inadvertent contact between the user's body (such as the user's arm or back of the hand) with the crown of the rotary input is reduced when compared with an electronic device having the shaft of the rotary device positioned at or below the centerline of the housing.

In another example, the electronic device may include a light source positioned within the housing, the light source emitting light in a direction toward a portion of the user's body; and a detector positioned within the housing, the detector detecting one or more reflections of the light from the portion of the user's body. In this example, the module determines whether the portion of the user's body is in contact with the crown, and if so, the input turn data may be considered invalid data.

In another embodiment, the electronic device may include one or more capacitive sensors positioned on the crown, the sensors configured to detect contact with a user's finger. In this example, the module determines whether the rotation of the rotary input resulted from contact between the user's finger and the crown, and if not, the input turn data may be considered invalid data.

In another example, an electronic device may include one or more sensors detecting a position or movement/deflection of the shaft. In this example, based on the shaft deflection the module determines whether the rotation of the rotary input resulted from contact with an upper portion of the crown, and if not, the input turn data may be considered invalid data.

The electronic device may be in various forms, such as a wearable computing device having a touchscreen coupled with the processor. In one example, if the module determines that the input turn data is valid data from the rotary input, the processor alters the contents of the touch screen bases on the input turn data; and if the turn data is determined to be invalid data resulting from false, unintended turns of the rotary input, the turn data is rejected and the processor does not alter the contents of the touch screen based on the input turn data.

According to another broad aspect of another embodiment of the present disclosure, disclosed herein is an electronic device having a housing, wherein the electronic device may include a processor; at least one rotary input coupled with the processor, the rotary input providing rotary input turn data to the processor when the rotary input is rotated, the rotary input having a shaft connected with a crown; and at least one module operating on the electronic device, the module determining whether the rotary input turn data from the rotary input is valid data resulting from a user's rotations of the rotary input.

In one example, the module determines whether an amount of rotations of the rotary input is greater than a threshold amount of rotations, and if so, the input turn data may be considered valid data. In another example, the module determines whether a rate of rotations of the rotary input is greater than a threshold rate of rotations, and if so, the input turn data may be considered valid data.

In another example, the electronic device may include a light source positioned within the housing, the light source emitting light in a direction toward a portion of the user's body; and a detector positioned within the housing, the detector detecting one or more reflections of the light as reflected from the portion of the user's body; wherein the module determines whether the portion of the user's body is in contact with a lower portion of the crown, and if not, the input turn data may be considered valid data.

In another example, the electronic device may include one or more capacitive sensors positioned on the crown, the sensors configured to detect contact with a user's finger; wherein the module determines whether the rotation of the rotary input resulted from contact between the user's finger and the crown, and if so, the input turn data may be considered valid data.

In one example, the electronic device may include one or more sensors detecting a position of the shaft; wherein the module determines whether the rotation of the rotary input resulted from contact with an upper portion of the crown, and if so, the input turn data may be considered valid data.

According to another broad aspect of another embodiment of the present disclosure, disclosed herein is a process for an electronic device having at least one rotary input providing data, the process may include detecting one or more rotations of the rotary input; and determining whether the rotations resulted from inadvertent contact with the rotary input. In one example, if the determining operation determines that the rotations resulted from inadvertent contact with the rotary input, the data from the rotary input may be rejected.

In another example, the process may include detecting a distance between the electronic device and a portion of a user's body; and comparing the distance to a threshold distance to determine whether the rotations resulted from inadvertent contact with the rotary input.

In another example, the process may include detecting a presence or an absence of contact on the rotary input with a user's finger to determine whether the rotations resulted from inadvertent contact with the rotary input.

In one example, the process may include detecting a position of a shaft of the rotary input to determine whether the rotations resulted from inadvertent contact with the rotary input.

Other embodiments of the disclosure are described herein. The features, utilities and advantages of various embodiments of this disclosure will be apparent from the following more particular description of embodiments as illustrated in the accompanying drawings.

DETAILED DESCRIPTION

Disclosed herein are various embodiments of mechanisms and processes for detecting and rejecting false, unintended rotations of rotary inputs of electronic devices, such as wearable computing devices. In one example of the present disclosure, an electronic device is provided with an optical detector that measures the distance between the electronic device and a surface of the wearer's forearm or hand, and when the distance is smaller than a baseline or threshold distance, the turns of the rotary input may be considered to be false, unintended turns. In another example of the present disclosure, a crown of a rotary input of an electronic device includes one or more capacitive sensors which detect the presence of a wearer's finger, which when absent, the turns of the rotary input may be considered to be false, unintended turns. In another example, deflections or positions of a shaft of a rotary input of an electronic device are measured and if the deflections/positions indicate an upward force on the rotary input (which are likely caused by the wearer's forearm or hand), the turns of the rotary input may be considered to be false, unintended turns. Other embodiments are described herein.

Figure 2:
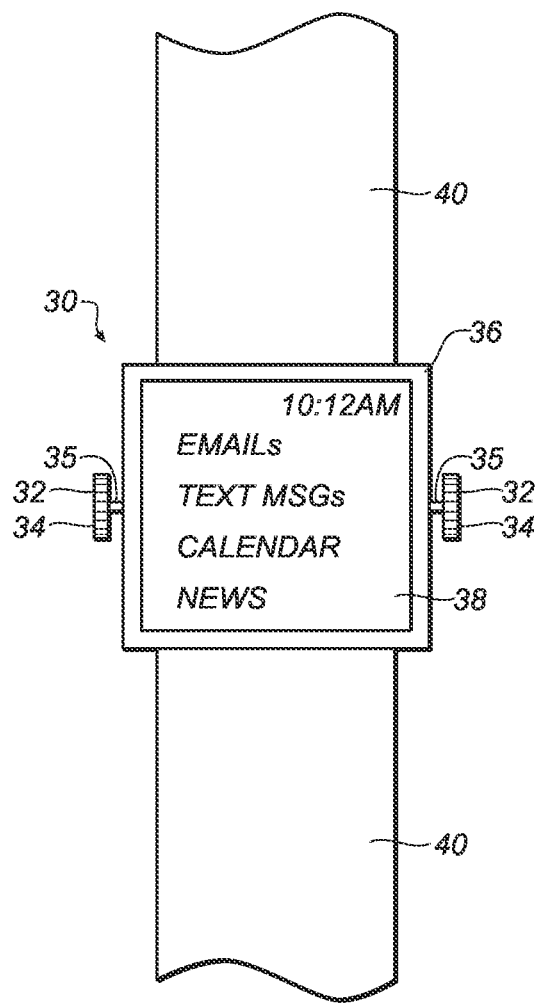
FIG. 2 illustrates an example of a wearable electronic device having one or more rotary inputs, in accordance with one embodiment of the present disclosure.

FIG. 2 illustrates an example of a wearable electronic device 30 having a plurality of rotatable inputs 32, in accordance with one embodiment of the present disclosure. Electronic device 30, in this example in the form of a computing device wearable on a user's wrist, may have one or more rotary inputs 32 which may include a crown or other structure 34 which may be attached to a shaft 35, wherein the crown 34 is configured to be rotated by the user, for instance by one or more of the user's fingers or thumbs. The electronic device 30 may include a housing 36 that encloses and protects the contents of electronic device 30, a display 38 (such as a touch screen) to display data and information to the user as well as to accept touch input from the user, audio output/speakers 39, and in one example may also include a band or other structure 40 to attach the electronic device 30 to the user, for instance to the user's arm.

Device 30 may be configured to accommodate both left and right handed use, in which case a user can decide to orient the device 30 and crown 34 pointing either up the user's arm or down the user's arm, as desired.

Figure 3:
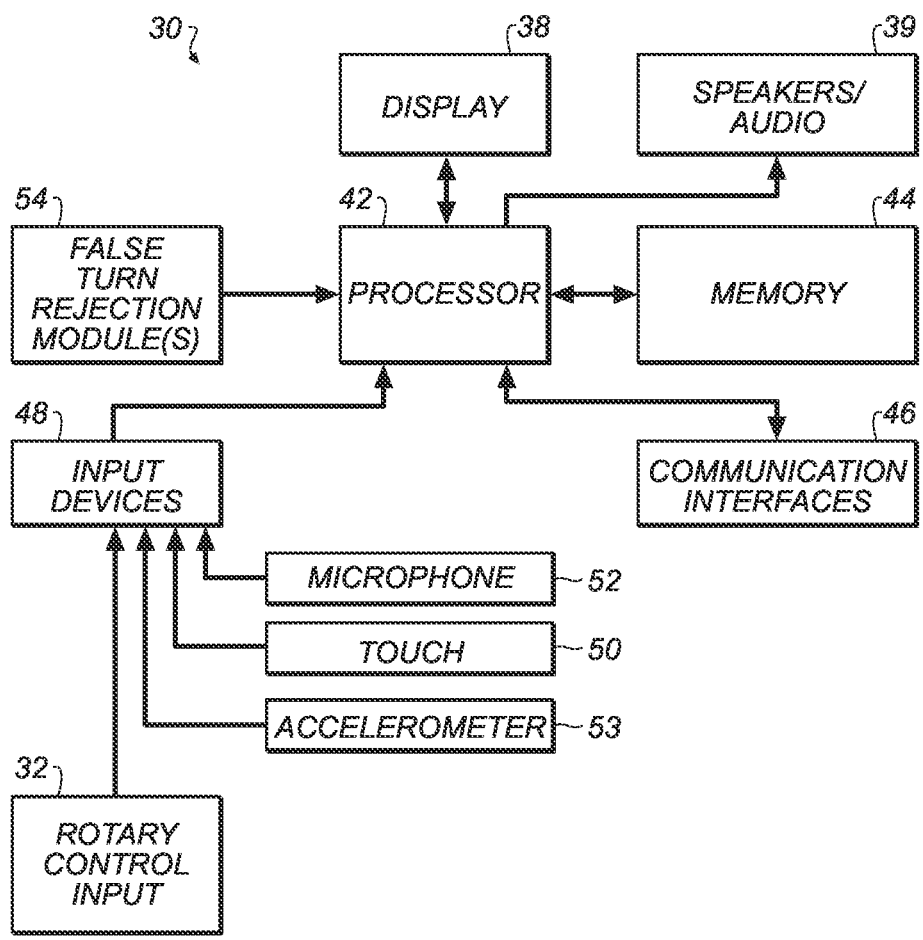
FIG. 3 illustrates an example of a block diagram of an electronic device having one or more rotatable inputs and one or more false turn rejection modules, in accordance with one embodiment of the present disclosure.

Electronic device 30 may be configured as a portable computing device, and as shown in FIG. 3, may include a processor 42, memory 44 (which may include ROM and RAM for program memory and data stores), and communications interfaces 46 (such as but not limited to wireless interfaces, Bluetooth interfaces, USB interfaces, Wi-Fi interfaces, TCP/IP interfaces, network communications interfaces, or any conventional communication interfaces).

Electronic device 30 may include various input devices 48, such as but not limited to, touch inputs 50 (which may be part of or separate from touchscreen 38), audio/microphone input 52, data from accelerometer(s) 53, and rotary inputs 32 which can be provided to enable a user to manipulate or control electronic device 30, and other inputs such as buttons, switches, sliders or any other conventional input.

In one example, rotary inputs 32 provide rotary input turn data to the processor 42, and such turn data may include, but is not limited to, a number of turns, or increments of turns, of crown 34, a direction of turns (e.g., clockwise or counterclockwise rotation of crown 34), a rate of turns, a length of time of rotations of crown 34, and other data and parameters as described herein.

As used herein, the terms "turns" or "rotations" or the like (such as in the phrases "false turns" or "inadvertent turns") include any movements, fractional rotations, partial rotations, full rotations, revolutions or any degree or amount of rotary movement of rotary input 32/crown 34, and these terms are used interchangeably herein.

Rotary input 32 allow a user to perform a variety of functions, such as but not limited to scroll contents of displays, scroll menus, scroll selections or options, manipulate lists or data, advance or rewind audio or video, move pointers, or perform other various controls of electronic device 30 or the content of display 38.

In accordance with some embodiments of the present disclosure, electronic device 30 may include one or more module(s) 54 for detecting and/or handling false or inadvertent movements or turns of the rotary inputs 32. Module(s) 54 may include one or more of the features, functions or processes disclosed herein. Module(s) 54 may be implemented in various manners, such as but not limited to, as hardware devices, specialized integrated circuits, logic, computer program products, code modules operating on processor 42 or device 30, or in any combination thereof.

Various embodiments of electronic device 30 are described having one or more module(s) 54 that can determine whether turns of rotary input 32/crown 34 (along with the associated rotary input turn data) are (or possibly are) false inadvertent turns with invalid data that were unintended by the user, or whether turns of rotary input 32/crown 34 (along with the associated rotary input turn data) are (or possibly are) turns with valid data that were intended by the user.

Figure 4:
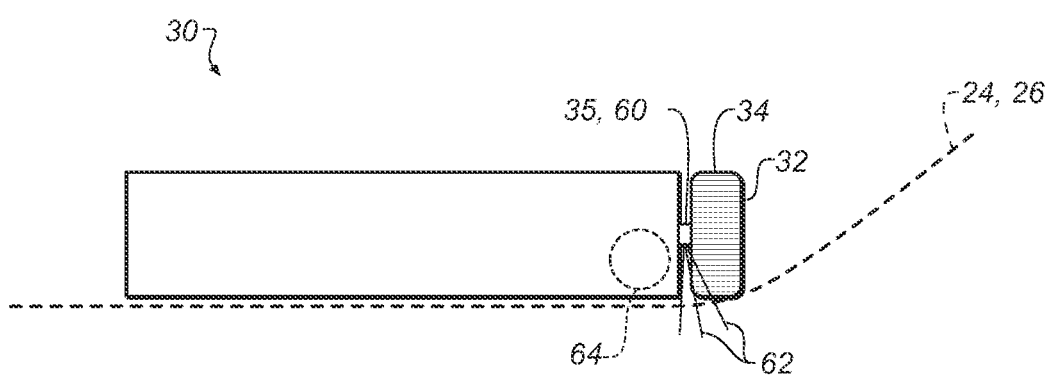
FIG. 4 illustrates an example of a block diagram of an electronic device with a rotary input, light source, and an optical detector to aid in detecting and rejecting false turns of the rotary input, in accordance with one embodiment of the present disclosure.

FIG. 4 illustrates an example of an electronic device 30 with a rotary input 32, wherein the electronic device is configured with a light source 60 to emit light 62 onto the wearer's body (such as the user's arm 24 or back of the user's hand 26), and a detector 64 that detects reflections of light 62. The light 62 can be emitted prior to and/or during rotation of the rotary input 32. Based on the characteristics of the reflections, electronic device 30 determines whether to reject the rotations of rotary input 32 as false, inadvertent rotations or as valid rotations intended by the user. For instance, the light 62 can be used to determine the distance from the crown to the wearer's arm 24 or back of the wearer's hand 26, and the determined distance can be used as a factor in deciding whether rotations of the crown 34 should be rejected or accepted. In one example, if the detected light reflections indicate that the wearer's arm 24 or hand 26 are outside of a specified distance away from the crown 34, then the rotations of crown 34 can be deemed valid rotations intended by the user; and conversely, if the detected light reflections indicate that the wearer's arm 24 or hand 26 are within a specified distance near the crown 34, then the rotations of crown 34 can be deemed false, inadvertent rotations and rejected.

In another example, the distance from the crown to the user's arm 24 or hand 26 is used as a factor in deciding whether to accept or reject rotations of the crown 34. For example, when the distance from the crown to the user's arm 24 or hand 26 goes to zero or is within a defined distance, turns of the crown 34 would be rejected unless it is detected that the crown was touched in at least two discrete places, such as a top portion of the crown and a bottom portion of the crown, such as when the user is attempting to rotate the crown while the user's hand is in an extension position.

In one example, the light source 60 can be a light emitting diode (LED) such as an infrared LED. In one embodiment, the shaft 35 of the rotary input 32 (or portions of the shaft) may be clear or transparent or may include a light pipe, and the light source 60 may be configured so that the light emits out of the shaft 35. In another example, the light source 60 may be positioned to transmit light out of the housing 26 of the electronic device 30, such as through an opening or a window in the housing 36.

Detector 64 can be an optical detector such as a photodiode that detects reflected light, such as but not limited to infrared light. The housing 36 may be provided with a window, and the detector 64 can be placed within the housing 36 adjacent to the window. For instance, the window may be a dedicated window in the housing 36, or a speaker port or other opening in the housing 36 can also serve as the window where the detector receives reflected light.

Figure 5:
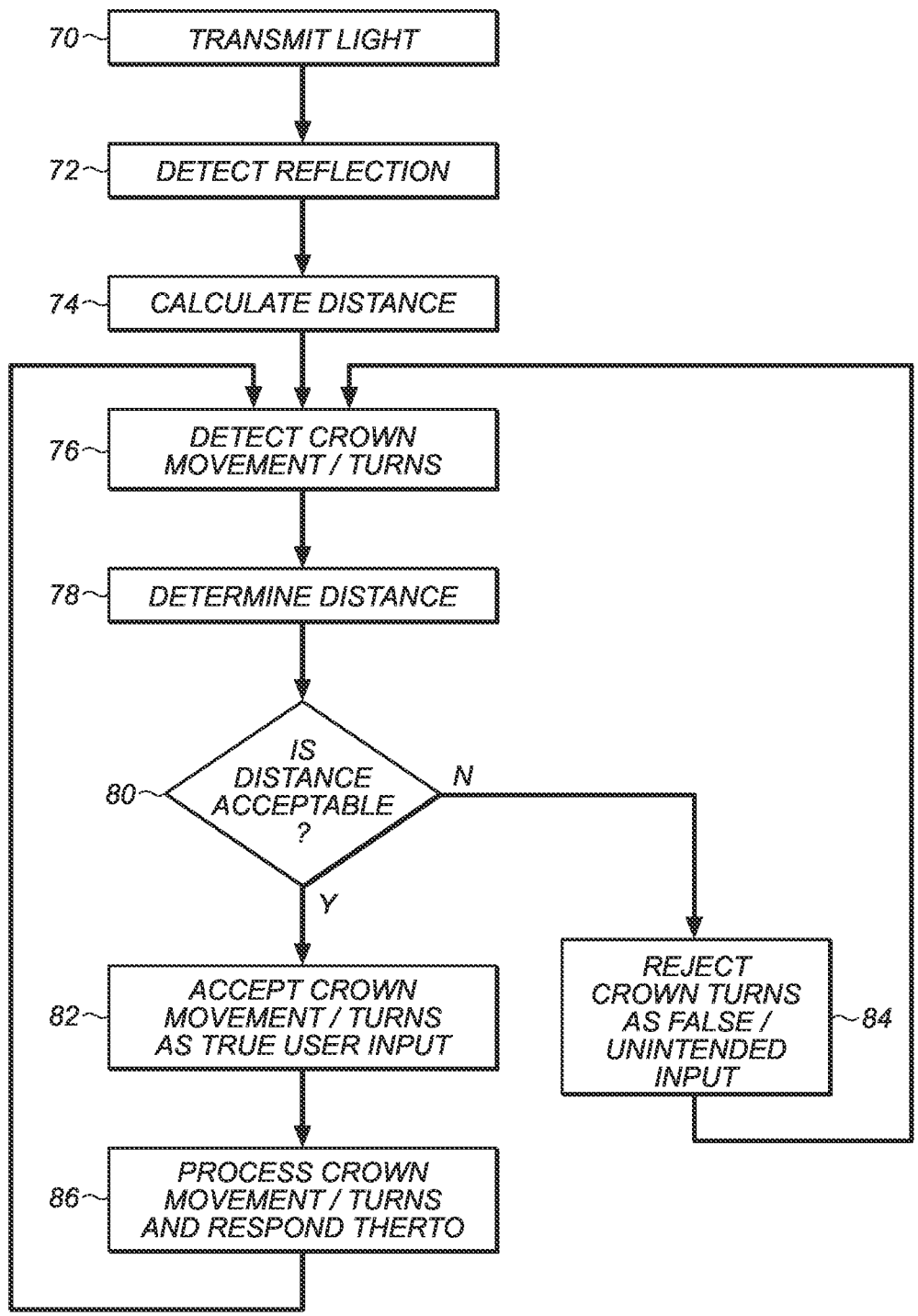
FIG. 5 illustrates an example of a process for detecting and rejecting false turns of a rotary input of an electronic device, in accordance with one embodiment of the present disclosure.

In FIG. 5, an example of a process for detecting and rejecting false turns of a rotary input of an electronic device is shown, in accordance with one embodiment of the present disclosure. At operation 70 light is transmitted by the electronic device. In one example, operation 70 transmits infrared light, although other types of light may be transmitted. Operation 72 detects reflections of the transmitted light.

At operation 74, a distance can be calculated based on the transmitted light of operation 70 and reflected light detected by operation 72. For instance, operation 72 can detect reflections of the transmitted light off of a user's arm or back of the hand depending upon the position of the electronic device relative to the user.

In one example, operations 70-74 may be performed during an initialization or calibration phase, for instance by prompting the user through the display of the electronic device for the user to place the electronic device on the user's wrist in a normal, flat, non-extended position. This can be used to determine a baseline or default distance value.

At operation 76, movements or turns of the crown or rotary input are detected, and operation 78 determines a distance, for instance a distance from the electronic device to a wearer's arm or back of the hand that exists while the crown is being rotated. In one example, operation 78 may include transmitting light, detecting reflected light, and calculating a distance based on the reflected light, in a manner similar to operation 70, 72, 74.

Operation 80 determines whether the distance measured by operation 80 is acceptable or unacceptable. For instance, operation 80 may determine whether the distance measured by operation 78 is below a desired threshold, wherein the threshold may be established by the distance calculated at operation 74. For instance, in one example, a distance of zero or near zero may indicate that the crown is in direct contact with the wearer's back of the hand or forearm. If an acceptable distance is measured by operation 78, then control may be passed to operation 82 where the rotations of the crown/rotary input are accepted as true, intended user input.

Conversely, if an unacceptable distance is measured by operation 78, then control may be passed to operation 84 where the rotations of the crown/rotary input may be rejected as false, unintended user input. In another example, operation 84 may indicate that the unacceptable distance be used as a factor in determining whether the turns of the rotary input of the electronic device may be false turns.

If operations 80-82 determine that the turns of the rotary input are true, intended turns, then operation 86 can process the movements of the rotary inputs as needed so that the electronic device responds appropriately to the user input received through the rotary input (such as but not limited to, changing the contents of the display, providing audible feedback, or otherwise processing the rotary input received from the user).

Figure 6A:
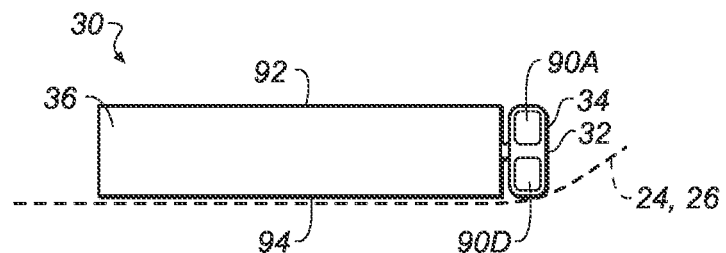
FIG. 6A illustrates an example of a block diagram of an electronic device with a rotary input having one or more capacitive sensors to aid in rejecting false turns of the rotary input, in accordance with one embodiment of the present disclosure.
Figure 6B:
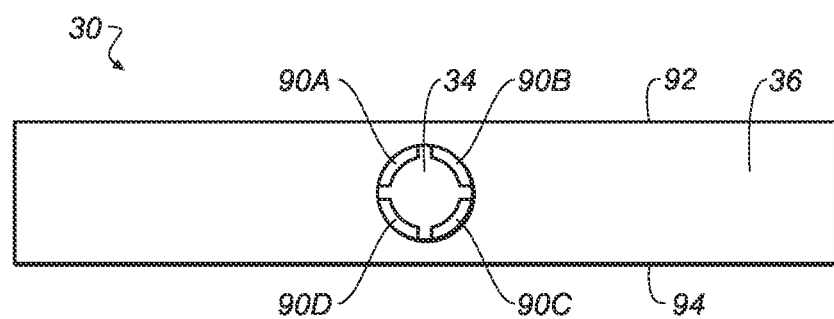
FIG. 6B illustrates a side view of FIG. 6A showing an electronic device with a rotary input having one or more capacitive sensors to aid in rejecting false turns of the rotary input, in accordance with one embodiment of the present disclosure.

In another embodiment of the present disclosure and referring to FIG. 6A-6B, an electronic device 30 can be formed having a rotary input 32 having one or more capacitive sensors 90 to aid in detecting and rejecting false turns of rotary input 32. In one example, capacitive sensors 90 are shown in FIG. 6B (side view) as four sensors 90A, 90B, 90C and 90D, each positioned about a portion of the crown 34. It is understood that more or fewer sensors 90 could be used, and sensors 90 could be positioned on other portions of crown 34 or positioned in different orientations on crown 34.

In one example, sensors 90 can be used sense distance to the wearer, for instance distance from the crown to the wearer's wrist or back of the hand, or to sense or detect actual contact therebetween. In another example, sensors 90 can also be used to detect a user's finger placed on top of crown 34, or on a side of crown 34, to actuate the crown. Sensors 90 can also be used to distinguish whether rotation of crown 34 is resulting from detected contact with the top of the crown, which would tend to indicate that the rotation is intended by the user through a finger of the user; or whether rotation is resulting from detected contact with the bottom of the crown 34, which would tend to indicate contact with a wearer's arm or back of their hand which is a false, unintended rotation that may be rejected.

In one example, electronic device 30 utilizes a rotary encoder (e.g., an absolute position rotary encoder) as part of the rotary input 32, and may also include with capacitive sensors 90 in the crown 34. The rotary encoder may be configured, in one example, to have marked lines, detents or other indicia delineating a portion, fraction, increment or unit of movement when compared with a full rotation of the rotary input 32. In one example, the rotary encoder may have 50 marked lines across a full 360 degree rotation, which can be interpolated upwardly by the processor 42, false turn rejection module 54 or other element within device 30, such as by a factor of four (4×) to create 200 counts per revolution or rotation which equates to approximately 1.8 degrees of resolution. In this manner, processor 54 and/or false turn rejection module 54 can detect a fractional/partial amount or degree of rotatory movement of the rotary input 32/crown 34 which is less than a full rotation of the rotary input 32/crown 34. It is understood that the amount of resolution of detected rotatory movement of rotary input 32/crown 34 can be larger or smaller in other embodiments, depending upon the particular implementation, as is the interpolation of such detected movement.

Electronic device 30 can be configured to dynamically determine, at any given time, which sensors 90 on the crown 34 are towards the upper portion or top surface 92 (FIG. 6A) of electronic device 30, and which sensors 90 on the crown are towards the lower portion or bottom surface 94 (FIG. 6A) of the electronic device 30. In one example, electronic device 30 could be configured so that rotations of the crown 34 resulting from contact detected by sensors 90 towards the lower portion/bottom 94 of the electronic device 30 may be ignored or rejected as false turns, while rotations of the crown 34 resulting from contact detected by sensors 90 towards the upper portion 92 of electronic device 30 may be accepted as valid input intended by the user. In another example, the lower portion of crown sensors 90 could be dynamically desensitized, while the upper portion of the crown sensors 90 could be dynamically highly sensitized.

In another example of the present disclosure, sensors 90 on crown 34 can be used to distinguish the touch of a finger versus false turns resulting from a touch of a wrist or back of the user's hand. Sensors 90 on crown 34 may sense the presence of a user's finger by determining a local capacitance maximum value detected; in contrast, the capacitance profile generated by contact of a user's wrist with sensors 90 may appear more like a plane of capacitance and less like a local maximum. In this manner, sensors 90 on crown 34 can be used to distinguish the touch of a finger versus false turns resulting from a touch of a wrist or back of the user's hand.

Figure 7:
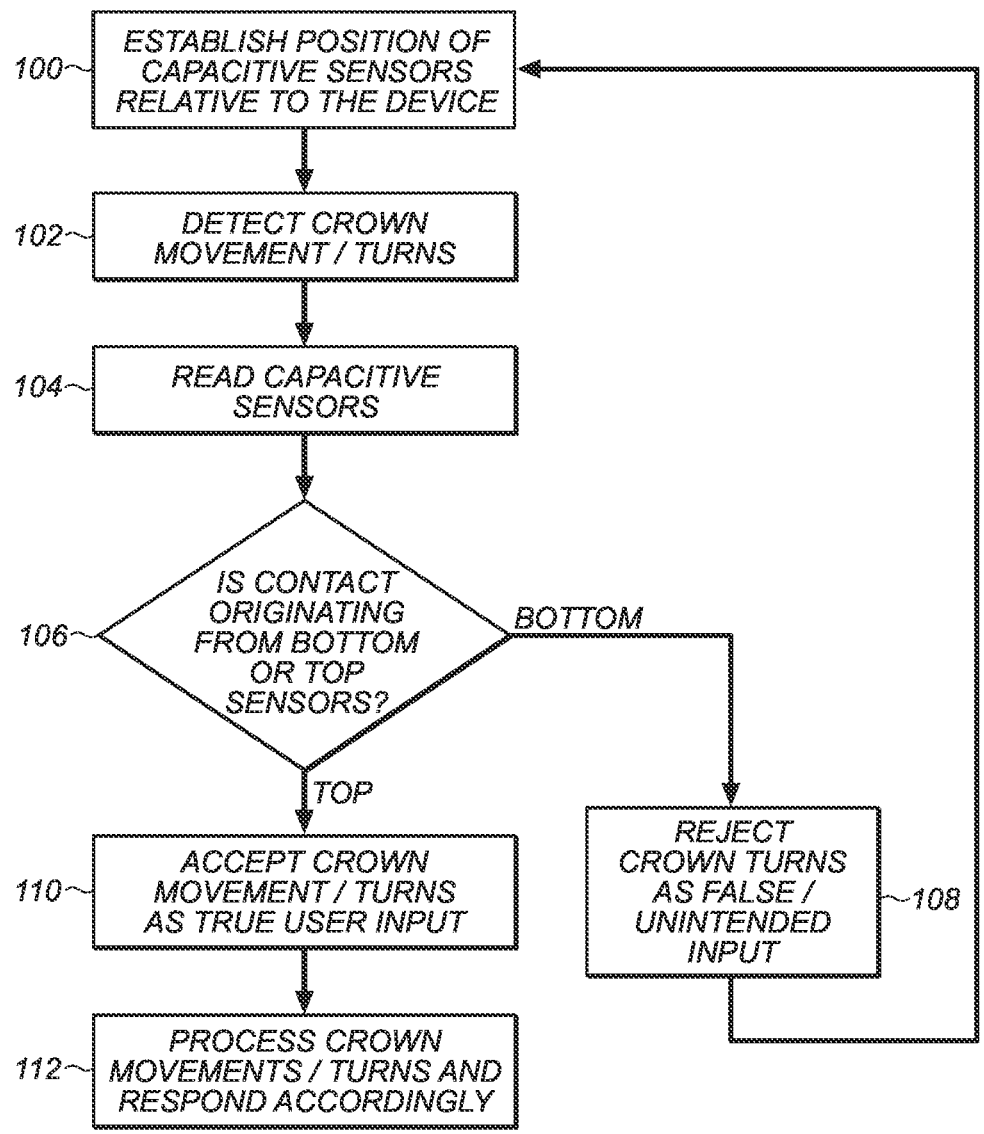
FIG. 7 illustrates an example of a process for detecting and rejecting false turns of a rotary input of an electronic device, in accordance with one embodiment of the present disclosure.

FIG. 7 illustrates an example of a process for detecting and rejecting false turns of a rotary input of an electronic device, in accordance with one embodiment of the present disclosure. At operation 100, the position of the capacitive sensors relative to the electronic device are determined. In one example, the position of the sensors relative to the top (92 in FIG. 6A) and/or bottom (94 in FIG. 6A) of the device may be determined based on the rotary position of the crown or position of the shaft of the crown, for instance through the use of a rotary encoder.

At operation 102, movements or turns of the rotary input device are detected. At operation 104, the capacitive sensors on the rotary input device are read, for instance, to determine which of the capacitive sensors detect touch or contact from a user. At operation 106, a determination is made whether the contact is originating from capacitive sensors positioned towards the bottom (94 in FIG. 6A) of the device or towards the top (92 in FIG. 6A) of the device. If operation 106 determines that contact is originating from sensors positioned towards the bottom of the device, then operation 108 may reject the turns of the rotary input as false or unintended turns.

Conversely, if operation 106 determines that contact is originating from sensors positioned toward the top of the device, then operation 110 may accept the turns of the rotary input as true, intended turns by the user. Operation 112 may then process the rotations of the rotary input, and the electronic device may respond accordingly.

In one example, if sensors towards the top and towards the bottom of the device are simultaneously triggered, this input scenario could mean that the user is contacting the top of the crown with a finger while the bottom of the crown is being contacted by the user's arm or back of the hand. In one example, such scenario could be processed as true user input based on an assumption that the user is intentionally rotating the rotary input in a manner that is overcoming the contact from the user's arm or back of the hand.

Figure 8:
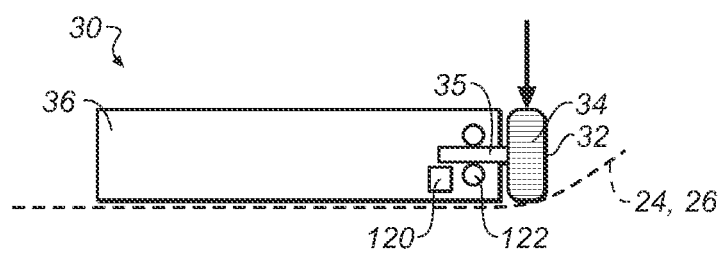
FIG. 8 illustrates an example of a block diagram of an electronic device with a rotary input and a shaft deflection detector to aid in rejecting false turns of the rotary input, in accordance with one embodiment of the present disclosure.

FIG. 8 illustrates an example of a block diagram of an electronic device 30 with a rotary input 32 having a crown 34 attached to a shaft 35, wherein a shaft deflection detector 120 is provided to aid in detecting and rejecting false turns of the rotary input 32, in accordance with one embodiment of the present disclosure. In one example, the shaft 35 of the rotary input 32 is positioned or supported by pivot supports or suspension supports 122, which may include one or more O-rings.

Shaft deflection detector 120, in one example, measures or determines the position of the shaft 35 (such as an internal end of the shaft 35), such as by determining the distance and/or direction that shaft 35 moves or travels during a rotation of rotary input 32. The deflections of shaft 35 are used to determine whether the turns of crown 34 are resulting from downward force for instance from a user's finger or thumb (which would be associated with true, intended rotary input), or resulting from upward force for instance from inadvertent contact between the crown 34 and the user's arm 24 or back of the hand 26 (which would be associated with false, unintended rotary input).

In another embodiment, detector 120 senses the moment or torque caused by downward pressure of a finger on the crown 34, compared to the negative moment caused by upward pressure of the user's arm 24 or wrist 26 on the crown 34.

Figure 9:
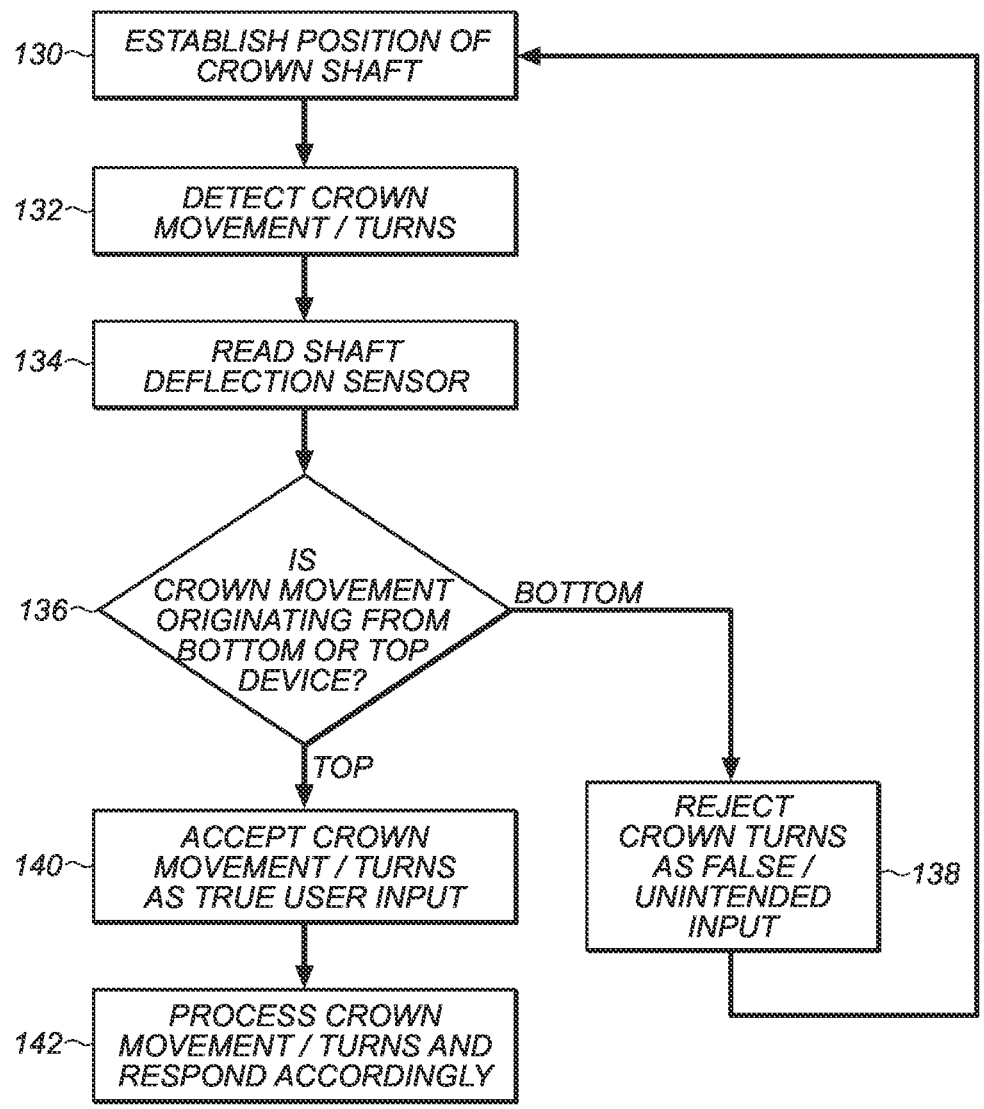
FIG. 9 illustrates an example of a process for detecting and rejecting false turns of a rotary input of an electronic device, in accordance with one embodiment of the present disclosure.

FIG. 9 illustrates an example of a process for detecting and rejecting false turns of a rotary input of an electronic device, in accordance with one embodiment of the present disclosure.

At operation 130, the position of the shaft of the rotary input relative to the electronic device is determined. In one example, the position of the shaft relative to the top and/or bottom of the device may be determined for instance through the use of a position sensor or torque sensor configured to monitor the shaft.

At operation 132, movements or turns of the rotary input device are detected. At operation 134, the deflection or direction of shaft movement is detected. At operation 136, a determination is made whether the rotation of the crown/rotary input is originating from generally upward contact with the crown, or originating from generally downward contact with the crown. If operation 136 determines that the rotation of the crown/rotary input is originating from generally upward contact with the crown—for instance from inadvertent contact between the crown 34 and the user's arm 24 or back of the hand 26 which would be associated with false, unintended rotary input—then operation 138 may reject the turns of the rotary input as false or unintended turns.

Conversely, if operation 136 determines that the rotation of the crown/rotary input is originating from generally downward contact with the crown—for instance from contact from a user's finger or thumb into the crown which would be associated with true, intended rotary input—then operation 140 may accept the turns of the rotary input as true, intended turns by the user. Operation 142 may then process the rotations of the rotary input, and the electronic device may respond accordingly.

Figure 10:
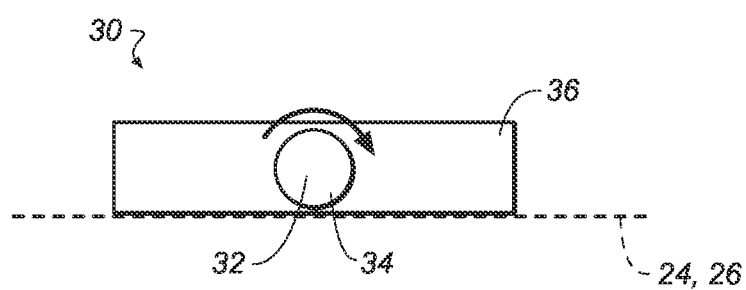
FIG. 10 illustrates an example of a block diagram of an electronic device with a rotary input and one or more modules to aid in detecting and rejecting false turns of the rotary input, in accordance with one embodiment of the present disclosure.

FIG. 10 illustrates an example an electronic device 30 with a rotary input 32 and one or more modules (for instance, modules 54 in FIG. 3) that aid in detecting and rejecting false turns of the rotary input 32, in accordance with one embodiment of the present disclosure.

In one example, modules 54 perform one or more functions or operations described herein. Modules 54 may also differentiate between true, intended turns of rotary input 32 and false, unintended turns of rotary input 32 by analyzing characteristics of the rotations detected by electronic device 30 when rotary input 32 moves. For instance, false turns would be expected to be relatively short duration, low torque events since they are often due to friction. These events could be rejected using a torque sensor measuring torque about the shaft axis, or a rotary detector or rotatory encoder in communications with the shaft 35 measuring characteristics of shaft rotations.

In one example, one or more thresholds (such as a minimum number of rotations, a minimum rate of rotations, a minimum amount of time during rotations, a minimum amount of rotational torque, or any combination thereof) may be defined and stored in device 30, wherein the characteristics of the detected rotations of rotary input 32 need to exceed the threshold before electronic device 30 accepts the rotations as valid, intended input from the user.

In one example, the electronic device 30, when in a sleep mode (for instance, with the display 38 off) and upon detecting rotation of rotary input 32, may determine whether the characteristics of the rotations exceed the threshold(s), and if not, the detected turns may be deemed false, unintended turns and the device 30 is maintained in the sleep mode (with the display 38 off), thereby conserving stored battery energy.

Conversely, if the device 30 determines the characteristics of the rotations exceed the threshold(s), the detected turns may be deemed true, intended turns and the device 30 awakes out of the sleep mode and the display 38 may be activated.

For instance as an example for illustrative purposes only, approximately 160 to 180 degrees of turn of the crown 34 of input 32 may be a minimum threshold to register or trigger waking up the electronic device 30 out of a sleep mode or to perform other functions of the electronic device 30.

In another example, once the device 30 is awake, the threshold(s) for accepting rotations of the rotary input could be reduced so as to accept lower torques or other lower rotary input characteristics as valid, intended rotary input.

Figure 11:
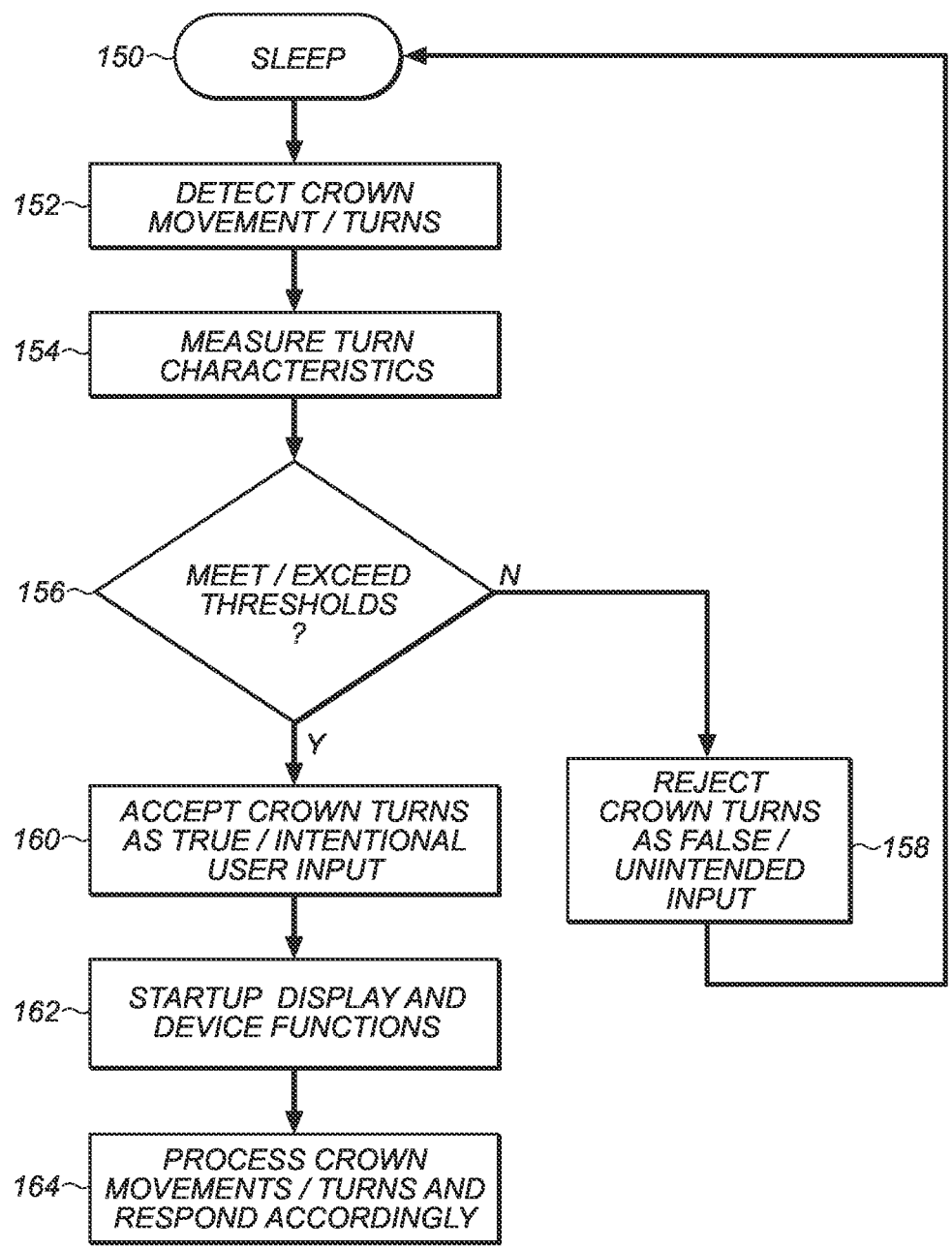
FIG. 11 illustrates an example of a process for detecting and rejecting false turns of a rotary input of an electronic device, in accordance with one embodiment of the present disclosure.

FIG. 11 illustrates an example of a process for detecting and rejecting false turns of a rotary input of an electronic device, in accordance with one embodiment of the present disclosure. At operation 150, the electronic device is in a sleep mode, for instance in a low-power mode with the display off and with one or more of other components of the electronic device in a low-power or sleep mode. At operation 152, movements or turns of the rotary input/crown are detected. At operation 154, characteristics of the rotation or movement of the rotary input are measured or determined. In one example, these characteristics may include but are not limited to the number of rotations, the rate of rotations, the amount of time during rotations, the amount of rotational torque, or any combination thereof.

At operation 156, a determination is made as to whether the characteristics of the detected rotations, as measured by operation 154, meet or exceed one or more rotation characteristic thresholds. These thresholds may include but are not limited to a minimum number of rotations, a minimum rate of rotations, a minimum amount of time during rotations, a minimum amount of rotational torque, or any combination thereof. If operation 156 determines that the detected rotations of the rotary input did not meet or exceed the rotation characteristic thresholds, then control is passed to operation 158 wherein the detected rotations/turns of the rotary input/crown may be rejected as false, unintended turns; and control may be returned to operation 150 wherein the electronic device is maintained in a sleep mode.

If operation 156 determines that the detected rotations of the rotary input do meet or exceed the rotation characteristic thresholds, then control is passed to operation 160 wherein the detected rotations/turns of the rotary input/crown may be accepted as true, intended turns and valid user input; and control may be passed to operation 162 wherein the electronic device may be awoken out of the sleep mode, and the display and other functional components of the device may be started up into a normal, operating mode. At operation 164, the movements of the rotary input/crown, for instance as detected by operation 152, are processed accordingly and the electronic device responds to such rotary input by performing one or more functions or operations programmed on the electronic device.

Figure 1A:
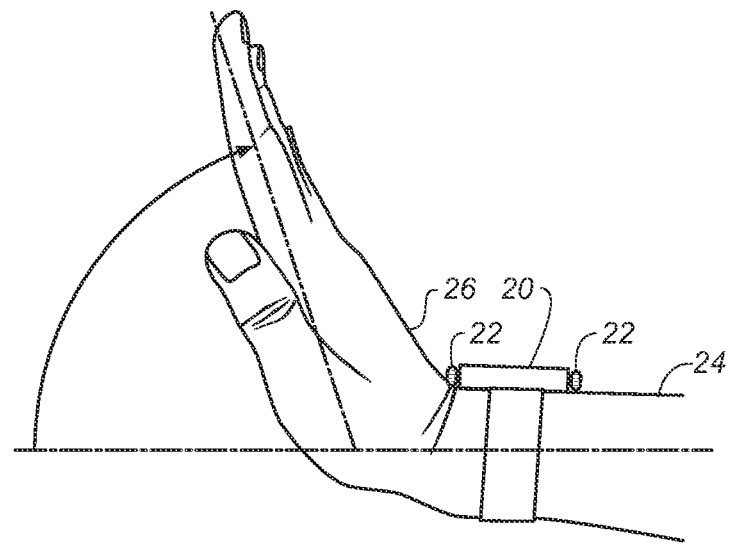
FIG. 1A illustrates an example of a wearable electronic device positioned on a user's arm which can generate false, inadvertent turns of a crown of a rotary input.

In another example of electronic device 30, a photoplethysmograph (PPG) sensor may be provided within device 30 to measures the relative blood flow through the user's body proximate the location of the electronic device (such as but not limited to the user's arm/wrist), and to detect, for instance, a wrist clench characteristic or a wrist extension condition. When a wrist clench or extension condition (such as shown in FIG. 1A) is detected via the PPG sensor data, these conditions may be considered by the electronic device 30 when determining whether detected rotations of the rotary input 32 are false/unintended turns or true/intended turns.

Figure 1B:
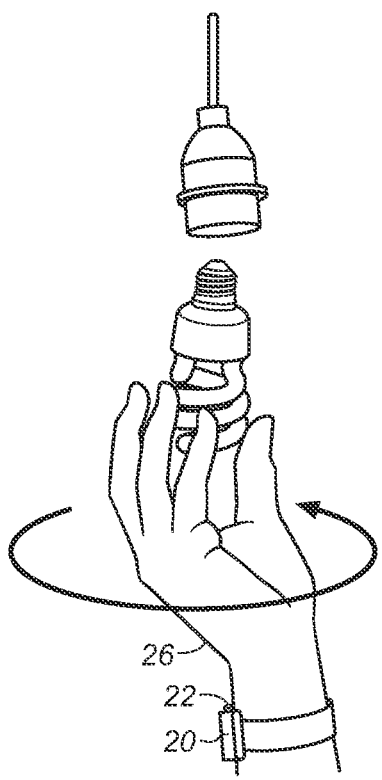
FIG. 1B illustrates an example of a wearable electronic device positioned on a user's arm which can generate false, inadvertent turns of the crown of the rotary input.
Figure 1C:
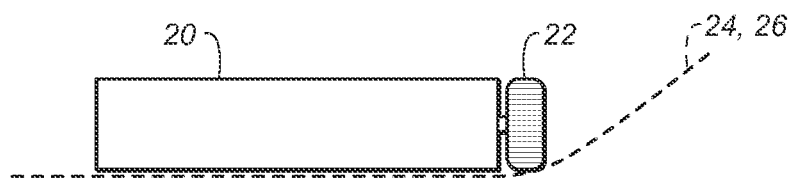
FIG. 1C illustrates a representation of a wearable electronic device positioned on a user's arm which can generate false, inadvertent turns of the crown of the rotary input.
Figure 12:
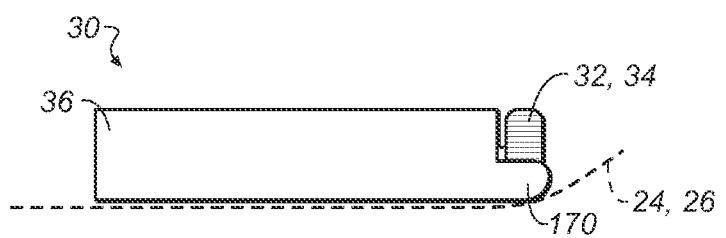
FIG. 12 illustrates an example of an electronic device with a rotary input having a mechanical structure to aid in reducing false turns of the rotary input, in accordance with one embodiment of the present disclosure.

FIG. 12 illustrates another example of an electronic device 30 with a rotary input 32 having a mechanical structure such as a shield 170 extending from the housing 36, wherein the shield 170 surrounds a portion of the crown 34. Shield 170 aids in reducing occurrences of false turns of the rotary input 32, by shielding or partially shielding crown 34 from physical contact with a user's arm 24 or back of hand 26 or other body parts. For instance, shield 170 can reduce the occurrence of false, inadvertent turns of rotary input 32/crown 34 during wrist extensions or other movement (such as movements shown in FIGS. 1A, 1B). Shield 170 may be configured to cover the bottom of the crown 34, the sides of crown 34, or both.

Figure 13:
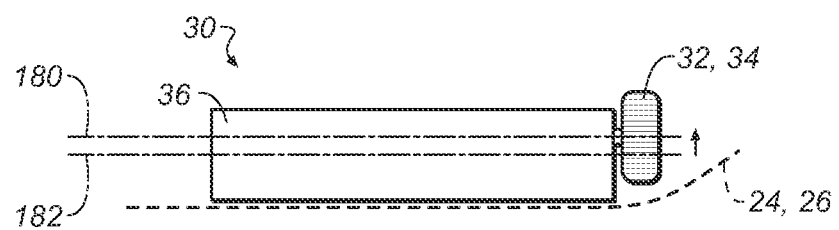
FIG. 13 illustrates an example of an electronic device with a rotary input positioned at an offset position to aid in reducing false turns of the rotary input, in accordance with one embodiment of the present disclosure.

FIG. 13 illustrates an example of an electronic device 30 with a rotary input 32 positioned at upwardly offset position to aid in reducing occurrences of false turns of the rotary input 32/crown 34, in accordance with one embodiment of the present disclosure. In this example, the crown 34 is positioned or centered about an axis 180 that is above the centerline 182 of the housing 36 of device 30. The upwardly offset position of rotary input 32 increases the amount of space between the bottom of the crown 34 and the user's back of the hand or lower forearm. In this manner, occurrences of false turns of crown 34 are decreased when compared with when the crown 34 is positioned or centered at or below the centerline 182 of the housing 36 of device 30.

In another example of electronic device 30, electronic device 30 can be configured so that if on touch screen 38, two fingers are detected as contacting display 38, then rotational input to the crown 34 may be considered false input.

In another example of electronic device 30, electronic device 30 may be configured so that when accelerometer 53 senses that the device 30 is moving with general rotational motion or with randomized motion (such as during exercise by the user), device 30 may require a larger amount of rotations of rotary input 32/crown 34 or a longer time duration of crown rotations, in order to accept the rotations/input as valid, intended input or to wake up device 30 if device 30 is in a sleep mode.

Hence, it can be seen that various embodiments of the present disclosure provide an electronic device 30 that detect and/or handle false or inadvertent movements or turns of the rotary inputs 32 which are unintended by the user. An electronic device 30 can be formed utilizing one or more of the features, functions, processes or structures disclosed herein.

While the methods disclosed herein have been described and shown with reference to particular operations performed in a particular order, it will be understood that these operations may be combined, sub-divided, or re-ordered to form equivalent methods without departing from the teachings of the present disclosure. Accordingly, unless specifically indicated herein, the order and grouping of the operations is not a limitation of the present disclosure.

It is understood that the directional references provided herein, such as top, bottom, upwards, downwards, clockwise, counterclockwise, left, right, and the like, are provided to describe examples of the embodiments disclosed herein, and are not intended to be limiting.

It should be appreciated that in the foregoing description of exemplary embodiments of the disclosure, various features of the disclosure are sometimes grouped together in a single embodiment, Figure, or description thereof for the purpose of streamlining the disclosure and aiding in the understanding of one or more of the various aspects. This method of disclosure, however, is not to be interpreted as reflecting an intention that the claims require more features than are expressly recited in each claim. Rather, inventive aspects lie in less than all features of a single foregoing disclosed embodiment, and each embodiment described herein may contain more than one inventive feature.

While the disclosure is presented and described with reference to embodiments thereof, it will be understood by those skilled in the art that various other changes in the form and details may be made without departing from the spirit and scope of the disclosure.

We claim:

1. An electronic watch comprising:
a display;
a housing at least partially surrounding the display;
a processor positioned within the housing; and
a crown positioned along a side of the housing, the crown comprising an array of sensors positioned along a periphery of an external surface of the crown and operably coupled to the processor, the array of sensors operable to detect a position of a touch at the external surface.

2. The electronic watch of claim 1, wherein:
the crown comprises a shaft that extends into an interior of the housing; and
the electronic watch further comprises a rotational sensor that is configured to detect a rotation of the crown.

3. The electronic watch of claim 2, wherein the rotational sensor is an optical sensor that is configured to detect the rotation of the crown using reflected light.

4. The electronic watch of claim 1, wherein the electronic watch is configured to determine if the position of the touch is along a top region or a bottom region of the external surface.

5. The electronic watch of claim 4, wherein:
in response to the touch being along the top region of the external surface, the electronic watch is configured to accept input from the crown; and
in response to the touch being along the bottom region of the external surface, the electronic watch is configured to reject input from the crown.

6. The electronic watch of claim 4, wherein the bottom region of the external surface is proximate to a wrist of a user when the electronic watch is worn.

7. The electronic watch of claim 1, wherein the electronic watch is configured to reject an input to the crown unless the touch is detected by the array of sensors.

8. A wearable electronic device comprising:
a housing;
a band coupled to the housing and configured to attach the wearable electronic device to a wrist;
a display positioned at least partially within the housing; and
a crown comprising:
a dial positioned along a side of the housing; and
an array of sensors positioned along an exterior of the dial and configured to detect a location of a touch on the dial.

9. The wearable electronic device of claim 8, wherein the display is configured to scroll displayed contents in response to an input provided to the crown.

10. The wearable electronic device of claim 8, wherein the wearable electronic device is configured to determine whether the location is along a top or a bottom of the dial.

11. The wearable electronic device of claim 10, wherein:
the wearable electronic device is configured to accept a crown input in response to a determination that the location is along the top of the dial; and
the wearable electronic device is configured to reject the crown input in response to a determination that the location is along the bottom of the dial.

12. The wearable electronic device of claim 8, wherein:
the wearable electronic device is configured to detect a contact with the wrist using the array of sensors; and
the wearable electronic device is configured to reject a crown input in response to detecting the contact with the wrist.

13. The wearable electronic device of claim 8, wherein the array of sensors is an array of capacitive sensors operable to detect capacitive coupling between the crown and an external object.

14. The wearable electronic device of claim 13, wherein:
the wearable electronic device is configured to detect a local capacitance maximum using the array of capacitive sensors; and
in response to detecting the local capacitance maximum, accept an input from the crown.

15. The wearable electronic device of claim 8, wherein:
the wearable electronic device further comprises an optical sensor; and
the optical sensor is configured to detect a rotational input provided to the crown.

16. An electronic watch comprising:
a housing;
a touch screen positioned at least partially within the housing;
a processor positioned within the housing; and
a crown positioned along a side of the housing, the crown comprising an array of capacitive sensors positioned along a periphery of the crown and operably coupled to the processor, the electronic watch configured to detect a location of a touch along the crown using the array of capacitive sensors.

17. The electronic watch of claim 16, wherein the electronic watch is configured to ignore an input to the crown in response to a determination that the touch is not detected.

18. The electronic watch of claim 17, wherein:
the electronic watch is configured to enter a sleep mode;
a graphical output is not displayed on the touch screen when the electronic watch is in the sleep mode; and
the electronic watch is configured to transition from the sleep mode to an operational mode in response to accepting the input.

19. The electronic watch of claim 16, wherein the electronic watch comprises a rotation sensor configured to detect rotational input provided to the crown.

20. The electronic watch of claim 19, wherein:
the electronic watch is configured to disregard the rotational input unless the location of the touch is along a top region of the crown; and
in response to disregarding the rotational input, the electronic watch is configured to maintain a static display on the touch screen.

* * * * *